United States Patent
Yang et al.

(10) Patent No.: US 11,330,623 B2
(45) Date of Patent: May 10, 2022

(54) APPLYING UPLINK PREEMPTION TO RANDOM ACCESS TRANSMISSION

(71) Applicant: QUALCOMM Incorporated, San Diego, CA (US)

(72) Inventors: Wei Yang, San Diego, CA (US); Jing Lei, San Diego, CA (US); Seyed Ali Akbar Fakoorian, San Diego, CA (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 16/991,984

(22) Filed: Aug. 12, 2020

(65) Prior Publication Data
US 2021/0051706 A1 Feb. 18, 2021

Related U.S. Application Data

(60) Provisional application No. 62/888,304, filed on Aug. 16, 2019.

(51) Int. Cl.
*H04W 74/00* (2009.01)
*H04W 76/10* (2018.01)
(Continued)

(52) U.S. Cl.
CPC ......... *H04W 74/006* (2013.01); *H04W 72/10* (2013.01); *H04W 74/04* (2013.01); *H04W 74/0833* (2013.01); *H04W 76/10* (2018.02)

(58) Field of Classification Search
CPC ............. H04W 72/0406; H04W 72/10; H04W 74/002; H04W 74/006; H04W 74/04; H04W 74/0833; H04W 76/10
See application file for complete search history.

(56) References Cited

U.S. PATENT DOCUMENTS

2018/0167971 A1* 6/2018 Liu .................. H04W 16/14
2020/0245302 A1* 7/2020 Pan .................. H04L 5/0094
(Continued)

OTHER PUBLICATIONS

Huawei et al., "Remaining Details on Random Access Prioritization", 3GPP Draft, R2-1801950, Remaining Details on Random Access Prioritization, 3GPP TSG-RAN WG2 #101, 3rd Generation Partnership Project (3GPP), Mobile Competence Centre, 650, Route Des Lucioles, F-06921, Sophia-Antipolis Cedex, vol. RAN WG2, No. Athens, Greece, Feb. 26, 2018-Mar. 2, 2018, Feb. 16, 2018 (Feb. 16, 2018), XP051400071, 3 Pages, Retrieved from the Internet: URL:http://www.3gpp.org/ftp/tsg%5Fran/WG2%5FRL2/TSGR2%5F101/Docs/ [retrieved on Feb. 16, 2018], p. 2, Second Paragraph after Proposal 3.
(Continued)

*Primary Examiner* — Kashif Siddiqui
(74) *Attorney, Agent, or Firm* — Holland & Hart LLP

(57) ABSTRACT

According to some examples, a base station may allocate uplink and/or downlink resources (e.g., in the time domain, frequency domain, spatial domain) to user equipment (UEs), or groups of UEs, that may be subsequently reallocated. For example, a base station may determine a reallocation of uplink resources, and may issue a preemption indication (e.g., a cancelation indication) that may correspond to at least a portion of a random access resource. UEs may be configured to monitor for preemption indications and, based on received preemption indications, UEs may determine whether or not to proceed with transmission of a random access message using a random access resource that at least partially overlaps with resources indicated by the preemption indication. For example, a UE may transmit, or preempt transmission of, a random access message based on a preemption configuration of the UE (e.g., configured rules for UE preemption of random access resources).

30 Claims, 19 Drawing Sheets

(51) Int. Cl.
H04W 74/04 (2009.01)
H04W 72/10 (2009.01)
H04W 74/08 (2009.01)

(56) References Cited

U.S. PATENT DOCUMENTS

2021/0100029 A1* 4/2021 Lei .................. H04W 72/14
2021/0135825 A1* 5/2021 Pan .................. H04W 72/042

OTHER PUBLICATIONS

International Search Report and Written Opinion—PCT/US2020/046176—ISA/EPO—Oct. 12, 2020 (194632WO).

Qualcomm Incorporated: "Uplink Inter-UE Tx Multiplexing and Prioritization", 3GPP Draft, R1-1907285, Uplink Inter-UE Tx Multiplexing and Prioritization, 3GPP TSG-RAN WG1 #97, 3rd Generation Partnership Project (3GPP), Mobile Competence Centre, 650, Route Des Lucioles, F-06921, Sophia-Antipolis Cedex, vol. RAN WG1, No. Reno, Nevada, USA, May 13, 2019-May 17, 2019, May 13, 2019 (May 13, 2019), XP051728725, 7 Pages, Retrieved from the Internet: URL:http://www.3gpp.org/ftp/Meetings%5F3GPP%5FSYNC/RAN1/Docs/R1%2D1907285%2Ezip [retrieved on May 13, 2019], Sections 2.2, 2.3 and 2.4.

Qualcomm Incorporated: "Uplink Inter-UE Tx Multiplexing and Prioritization", 3GPP Draft, R1-1911122, Uplink Inter-UE Tx Multiplexing and Prioritization, 3GPP TSG-RAN WG1 #98b, 3rd Generation Partnership Project (3GPP), Mobile Competence Centre, 650, Route Des Lucioles, F-06921, Sophia-Antipolis Cedex, vol. RAN WG1, No. Chongqing, China, Oct. 14, 2019-Oct. 20, 2019, Oct. 8, 2019 (Oct. 8, 2019), XP051809292, 9 Pages, Retrieved from the Internet: URL:https://ftp.3gpp.org/tsg_ran/WG1_RL1/TSGR1_98b/Docs/R1-1911122.zip, R1-1911122, Uplink Inter-UE Tx Multiplexing and Prioritization.docx [retrieved on Oct. 8, 2019], Section "2.3 Applicability of UL Cancellation Indication to Uplink channels".

* cited by examiner

APPLYING UPLINK PREEMPTION TO RANDOM ACCESS TRANSMISSION

CROSS REFERENCE

The present application for patent claims the benefit of U.S. Provisional Patent Application No. 62/888,304 by YANG et al., entitled "APPLYING UPLINK PREEMPTION TO RANDOM ACCESS TRANSMISSION," filed Aug. 16, 2019, assigned to the assignee hereof, and expressly incorporated by reference herein.

BACKGROUND

The present disclosure relates generally to wireless communications, and more specifically to application of uplink preemption to random access transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems, such as NR systems, may support heterogeneous conditions for one or more service deployments. For example, communication devices, such as a base station or a UE, may support flexibility in allocating multiple supported services or traffic types over resources of a channel. As part of the allocation of channel resources, a base station and a UE may support the prioritization of some communications over others, which may include prioritization of traffic or services having different reliability thresholds, different latency thresholds, etc. In some cases, efficient system utilization may be based on how resources are shared or allocated between different traffic types, or how UEs are configured according to different traffic types.

SUMMARY

The described techniques relate to improved methods, systems, devices, and apparatuses that support application of uplink preemption to random access transmission. In some examples, a base station or other network entity may allocate uplink and/or downlink resources for one or more user equipment (UEs) that may subsequently be reallocated (e.g., based on a reprioritization of communications) to other UEs, or other groups of UEs. For example, a base station may determine a reallocation of uplink resources and issue a preemption indication (e.g., an uplink preemption indication (ULPI) or a downlink preemption indication (DLPI)) that may correspond to at least a portion of the previously-allocated resources (e.g., as allocated to particular UEs). UEs may be configured to monitor for preemption indications and, based on received preemption indications, UEs may determine whether or not to proceed with an uplink transmission using their previously-allocated resources.

For example, a preemption indication (e.g., an ULPI) may be used to prevent a UE from using at least a portion of preconfigured or previously-allocated uplink resources for an uplink transmission. A base station may thus support dynamic allocation of uplink resources from communications associated with one latency threshold to communications associated with another latency threshold. For example, resources that were originally allocated to enhanced mobile broadband (eMBB) communications may be reallocated to ultra-reliable low-latency communications (URLLC) (e.g., a reallocation of resources towards more performance-sensitive communications, higher priority traffic, etc.). In one example, an eMBB UE that decodes an ULPI may cancel or otherwise preempt uplink transmission corresponding to resources (e.g., time and frequency resources) associated with the ULPI.

According to one or more aspects of the techniques described herein, a base station may determine to reclaim or reallocate uplink resources, and may issue a preemption indication (e.g., an ULPI) that may correspond to at least a portion of a UE random access resource. UEs may be configured to monitor for preemption indications and, upon reception of a preemption indication, a UE may determine whether or not to proceed with transmission of a random access messages using a random access resource (e.g., in cases where the random access resource at least partially overlaps with resources indicated by the preemption indication). For example, when an ULPI indicates that at least a portion of a random access resource is being preempted, a UE may transmit an associated random access message or the UE may preempt transmission of an associated random access message based on a preemption configuration of the UE (e.g., based on rules or instructions configured for UE preemption of random access resources).

The described preemption configurations and preemption application techniques may provide for efficient UE handling of preemption indications (e.g., ULPIs) corresponding to random access message transmissions. For example, preemption configurations may configure UE application of uplink preemption (e.g., adherence to or disregard to ULPIs) based on whether a random access message (associated with a random access resource being at least partially preempted) is to be transmitted as part of a contention-free random access (CFRA) procedure or a contention-based random access (CBRA) procedure. Further, preemption configurations may configure UE application of uplink preemption based on random access triggering conditions (e.g., based on what events or circumstances trigger a random access procedure associated with a resource being at least partially preempted).

A method of wireless communications by a UE is described. The method may include identifying a preemption configuration that indicates in which operating state of a set of operating states the UE is to monitor for an uplink preemption indication and transmitting or preempting transmission of a random access message via a random access resource based on the preemption configuration.

An apparatus for wireless communications by a UE is described. The apparatus may include a processor, memory coupled with the processor, and instructions stored in the memory. The instructions may be executable by the processor to cause the apparatus to identify a preemption configuration that indicates in which operating state of a set of operating states the UE is to monitor for an uplink preemption indication and transmit or preempt transmission of a random access message via a random access resource based on the preemption configuration.

In some examples of the method, apparatuses, and non-transitory computer-readable medium described herein, identifying the preemption configuration may include operations, features, means, or instructions for identifying that the preemption configuration indicates to monitor for the uplink preemption indication when the UE may be operating in a connected operating state of the set of operating states. Some examples of the method, apparatuses, and non-transitory computer-readable medium described herein may further include operations, features, means, or instructions for monitoring for the uplink preemption indication based on the UE operating in a connected operating state of the set of operating states.

Some examples of the method, apparatuses, and non-transitory computer-readable medium described herein may further include operations, features, means, or instructions for receiving, from a base station, the uplink preemption indication indicating that at least a portion of the random access resource may be being preempted, where the random access message may be transmitted or preempted from transmission via the random access resource based on the uplink preemption indication. Some examples of the method, apparatuses, and non-transitory computer-readable medium described herein may further include operations, features, means, or instructions for skipping monitoring for the uplink preemption indication based on the UE operating in an idle operating state, an inactive operating state, or both, of the set of operating states, where the random access message may be transmitted via the random access resource based on the UE operating in the idle operating state, the inactive operating state, or both.

In some examples of the method, apparatuses, and non-transitory computer-readable medium described herein, identifying the preemption configuration may include operations, features, means, or instructions for identifying that the preemption configuration indicates that uplink preemption does not apply to a contention-based random access procedure. In some examples of the method, apparatuses, and non-transitory computer-readable medium described herein, transmitting or preempting transmission of the random access message may include operations, features, means, or instructions for transmitting the random access message in accordance with the contention-based random access procedure.

In some examples of the method, apparatuses, and non-transitory computer-readable medium described herein, identifying the preemption configuration may include operations, features, means, or instructions for identifying that the preemption configuration indicates that uplink preemption applies to a contention free random access procedure. In some examples of the method, apparatuses, and non-transitory computer-readable medium described herein, transmitting or preempting transmission of the random access message may include operations, features, means, or instructions for preempting transmission of the random access message in accordance with the contention free random access procedure.

In some examples of the method, apparatuses, and non-transitory computer-readable medium described herein, preempting transmission of the random message may include operations, features, means, or instructions for preempting transmission of a random access preamble message. In some examples of the method, apparatuses, and non-transitory computer-readable medium described herein, preempting transmission of the random access message may include operations, features, means, or instructions for preempting transmission of a random access preamble message and a random access payload message.

In some examples of the method, apparatuses, and non-transitory computer-readable medium described herein, identifying the preemption configuration may include operations, features, means, or instructions for identifying that the preemption configuration indicates that uplink preemption applies to a random access procedure triggered by at least one of the following: a downlink control channel order, beam failure recovery, a system information request, an uplink resource request, a scheduling request failure, or any combination thereof.

In some examples of the method, apparatuses, and non-transitory computer-readable medium described herein, identifying the preemption configuration may include operations, features, means, or instructions for identifying that the preemption configuration indicates that uplink preemption does not apply to a random access procedure triggered by at least one of the following: initial access, handover, establishing a timing advance for addition of a secondary cell, uplink timing advance reestablishment, radio resource control connection re-establishment, or any combination thereof.

In some examples of the method, apparatuses, and non-transitory computer-readable medium described herein, identifying the preemption configuration may include operations, features, means, or instructions for identifying that the preemption configuration indicates that uplink preemption applies to a random access procedure in a secondary cell. In some examples of the method, apparatuses, and non-transitory computer-readable medium described herein, identifying the preemption configuration may include operations, features, means, or instructions for identifying that the preemption configuration indicates that uplink preemption does not apply to a random access procedure in a primary cell.

In some examples of the method, apparatuses, and non-transitory computer-readable medium described herein, transmitting or preempting transmission of the random access message may include operations, features, means, or instructions for preempting transmission of the random access message. Some examples of the method, apparatuses, and non-transitory computer-readable medium described herein may further include operations, features, means, or instructions for transmission of an entirety of the random access message may be preempted.

In some examples of the method, apparatuses, and non-transitory computer-readable medium described herein, preempting transmission of the random access message may include operations, features, means, or instructions for preempting transmission of the random access message based on dropping the random access message on a transmission time interval by transmission time interval basis, where the random access message spans more than one transmission time interval.

In some examples of the method, apparatuses, and non-transitory computer-readable medium described herein, the UE does not increase a transmission power level, increment a power ramping counter, increment a transmission counter, or any combination thereof, based on preempting transmission of the random access message. Some examples of the method, apparatuses, and non-transitory computer-readable medium described herein may further include operations, features, means, or instructions for transmitting the random access message in a next available random access resource subsequent to preempting transmission of the random access message via the random access resource.

Some examples of the method, apparatuses, and non-transitory computer-readable medium described herein may further include operations, features, means, or instructions for receiving a first downlink control channel order that schedules transmission of the random access message, and monitoring for a second downlink control channel order subsequent to preempting transmission of the random access message. In some examples of the method, apparatuses, and non-transitory computer-readable medium described herein, transmitting or preempting transmission of the random access message may include operations, features, means, or instructions for transmitting the random access message.

In some examples of the method, apparatuses, and non-transitory computer-readable medium described herein, a first subcarrier spacing of a bandwidth part of a serving cell on which the uplink preemption indication may be transmitted differs from a second subcarrier spacing of the bandwidth part of the serving cell for the random access resource. In some examples of the method, apparatuses, and non-transitory computer-readable medium described herein, transmitting or preempting transmission of the random access message may include operations, features, means, or instructions for preempting transmission of the random access message during a first transmission time interval of the random access resource that overlaps with a second transmission time interval that the uplink preemption indication indicates may be preempted, the first transmission time interval having a longer duration than the second transmission time interval.

In some examples of the method, apparatuses, and non-transitory computer-readable medium described herein, transmitting or preempting transmission of the random access message may include operations, features, means, or instructions for transmitting the random access message during a first transmission time interval of the random access resource that does not overlap with a second transmission time interval that the uplink preemption indication indicates may be preempted, the first transmission time interval having a longer duration than the second transmission time interval.

A method of wireless communications by a base station is described. The method may include establishing connectivity with a UE in a connected state, transmitting, to the UE, an uplink preemption indication indicating that at least a portion of a random access resource is being preempted based on the connected state, and scheduling the random access resource based on the uplink preemption indication.

An apparatus for wireless communications by a base station is described. The apparatus may include a processor, memory coupled with the processor, and instructions stored in the memory. The instructions may be executable by the processor to cause the apparatus to establish connectivity with a UE in a connected state, transmit, to the UE, an uplink preemption indication indicating that at least a portion of a random access resource is being preempted based on the connected state, and schedule the random access resource based on the uplink preemption indication.

Some examples of the method, apparatuses, and non-transitory computer-readable medium described herein may further include operations, features, means, or instructions for receiving, from the UE, a random access message in a next available random access resource subsequent to preempting transmission of the random access message via the random access resource. Some examples of the method, apparatuses, and non-transitory computer-readable medium described herein may further include operations, features, means, or instructions for transmitting a first control channel order that schedules transmission of a random access message, and transmitting a second control channel order subsequent to preempting transmission of the random access message. In some examples of the method, apparatuses, and non-transitory computer-readable medium described herein, a first subcarrier spacing of a bandwidth part of a serving cell on which the uplink preemption indication may be transmitted differs from a second subcarrier spacing of the bandwidth part of the serving cell for the random access resource.

DETAILED DESCRIPTION

Figure 1:
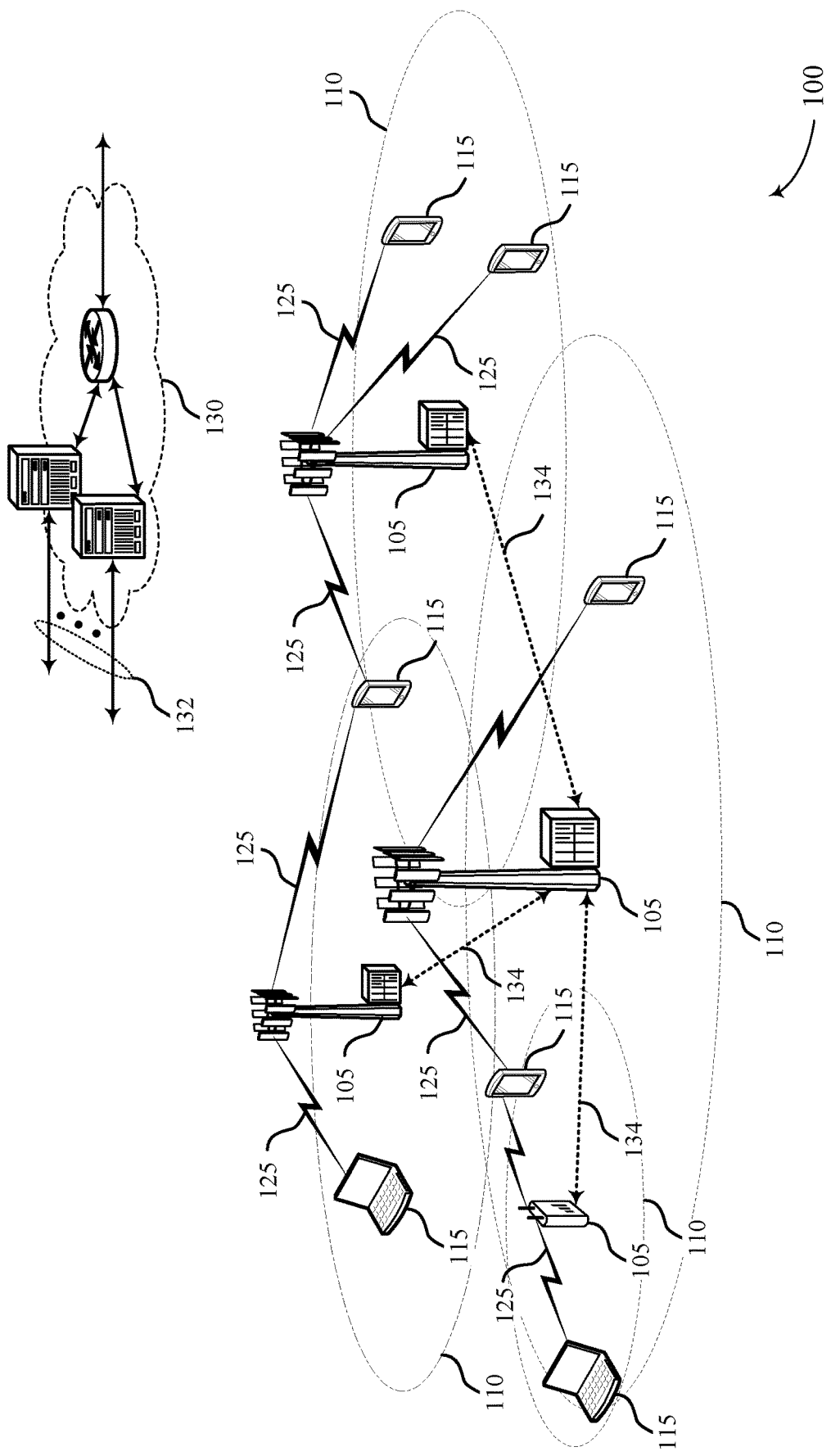
FIG. 1 illustrates an example of a system for wireless communications that supports application of uplink preemption to random access transmission in accordance with aspects of the present disclosure.

Some communication systems may support different traffic types (e.g., traffic categories), which may include or refer to communication traffic having different reliability thresholds, different latency thresholds, different services, or various combinations thereof. For example, a wireless communication system may support a first traffic type (e.g., a first type of communications) associated with relatively high reliability thresholds and relatively low latency thresholds, such as ultra-reliable low-latency communications (URLLC) traffic. The wireless communication system may also support other traffic types, associated with relatively low reliability thresholds and relatively long or relaxed latency thresholds, such as enhanced mobile broadband (eMBB) traffic. In some cases, to support various system operations (e.g., efficient utilization of wireless communication resources, appropriate allocation or balancing of wireless communication resources, appropriate support of traffic according to different prioritization or latency thresholds), a wireless communications system may support dynamic resource sharing between traffic types. For example, wireless communications systems may support dynamic allocation of resources between URLLC communications and eMBB communications, or other communications, according to different traffic types, categories, or other prioritizations.

The described techniques include various examples of dynamic resource allocation by way of preemption (e.g., or cancelation) of previously-allocated uplink resources by a network entity, such as a base station or other controller or resource allocation authority in communication with a base station. For example, a base station, or other network entity, may allocate uplink resources (e.g., an initial uplink resource allocation) to user equipment (UEs), or groups of UEs, and the base station may subsequently issue a preemption indication (e.g., an uplink preemption indication (ULPI) or a downlink preemption indication (DLPI)) that may correspond to at least a portion of the previously-allocated uplink or downlink resources (e.g., as allocated to particular UEs). UEs may detect such a preemption indication and determine whether or not to proceed with an uplink transmission using their previously-allocated uplink resources (e.g., based on whether or not the preemption indication is directed to the UE, based on rules for application of ULPI, etc.).

In some examples, a preemption indication may be used to prevent a UE from using at least a portion of previously-allocated uplink resources for an uplink transmission (e.g., such that a wireless communications system may support a dynamic allocation of uplink resources from communications associated with one latency threshold to communications associated with another latency threshold, or some other reallocation based on communications prioritization). For example, resources that were originally allocated to eMBB communications may be reallocated to URLLC communications (e.g., a reallocation towards more performance-sensitive communications).

However, in some scenarios, it may or may not be efficient for some transmissions (e.g., some random access transmissions) to be terminated or preempted even if such preemption is indicated by an ULPI. For example, preemption of random access message transmission in some random access scenarios (e.g., such as for random access message transmission associated with a contention-based random access (CBRA) procedure) may, in some cases, adversely impact efficient prioritization of communications within wireless communications system. As such, that consideration and management of tradeoffs between reallocation of previously allocated resources for high priority communications and resulting random access message preemption may be desirable.

For example, in some cases, a UE may have previously established a radio resource control (RRC) connection with a base station, and the UE may receive an ULPI indicating that at least a portion of a contention-free random access (CFRA) resource is being preempted. In such cases, it may be efficient for the UE to preempt transmission of a CFRA transmission when prompted by a received ULPI (e.g., as the base station may have prior knowledge of the UE priority, of priority associated with communications supported or employed by the UE, etc., based on the previously established RRC connection). Alternatively, a UE may not have previously established an RRC connection with a base station (e.g., as the UE may be attempting initial access), and the UE may receive an ULPI indicating that at least a portion of a CBRA resource is being preempted. In such cases, it may be inefficient for the UE preempt transmission of the random access message (e.g., as the base station may have relatively less (or no) prior knowledge of the UE priority, as the base station may have relatively less (or no) prior knowledge of the priority associated with communications supported or employed by the UE, as the UE may not be monitoring for ULPIs, etc.). That is, in cases where ULPI indicates that at least a portion of a CBRA resource is preempted, it may be efficient for the UE to proceed with the CBRA transmission regardless (e.g., as in such scenarios the base station may be unaware whether the UE will support ULPIs, as the UE supported services or communications may alter efficient dynamic resource allocation and ULPI usage by the base station, etc.).

Accordingly, the described techniques may provide for efficient preemption configuration for UEs. Preemption configurations may provide for more efficient resource utilization and resource reallocation within a wireless communications system supporting various service deployments. Specifically, aspects of the described preemption configurations may provide for efficient UE handling of ULPIs associated with random access message transmissions based on whether the random access message is transmitted as part of a CFRA procedure or as part of a CBRA procedure. Further, aspects of the described preemption configurations may provide for efficient handling of ULPIs associated with random access message transmissions based on the random access triggering conditions (e.g., based on what events or circumstances trigger the random access message transmission by the UE).

Wireless communications systems may thus employ preemption configurations (e.g., uplink preemption applicability rules, rules for application of ULPIs, etc.) to balance tradeoffs between reallocation of previously-allocated resources for high priority communications and ramifications of preempting certain random access messages. As such, UEs may be configured with a preemption configuration, and may handle ULPIs (e.g., may transmit an associated random access message or preempt transmission of an associated random access message) in accordance with the preemption configuration. Thus, the described techniques may provide for dynamic redistribution of uplink resources in a wireless communication system to more-effectively balance the performance and resource utilization of communications according to different priorities. Further, the described techniques may provide for efficient adherence to preemption indications (e.g., in cases where resources indicated by preemption indications correspond to resources for random access procedures). For example, the described preemption configurations (e.g., rules for application of ULPIs to UE transmission of random access messages) may provide for efficient communication preemption, such that certain random access procedures are not unnecessarily or inefficiently preempted by a UE.

Aspects of the disclosure are initially described in the context of a wireless communications system. Aspects of the disclosure are further illustrated by and described with reference to examples of signaling, operations, and diagrams that may support one or more aspects of the described techniques for application of uplink preemption to random access transmission. Aspects of the disclosure are further illustrated by and described with reference to apparatus diagrams, system diagrams, and flowcharts that relate to application of uplink preemption to random access transmission.

FIG. 1 illustrates an example of a wireless communications system 100 that supports uplink preemption applicability techniques in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and, in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The wireless communications system 100 may be configured to support different traffic types (e.g., traffic categories, traffic priorities, service priorities), which may include or refer to communication traffic having different reliability thresholds, different latency thresholds, different services, or various combinations thereof. For example, the wireless communications system 100 may support a first traffic type associated with relatively high reliability targets or thresholds and relatively low latency targets or thresholds, such as a URLLC traffic type. The wireless communications system 100 may also support a second traffic type, associated with relatively low reliability targets or thresholds and relatively long or relaxed latency thresholds, such an eMBB traffic type. In some cases, to support various system operations (e.g., efficient utilization of wireless communication resources, appropriate allocation or balancing of wireless communication resources, appropriate support of traffic according to different prioritization or latency threshold), the wireless communications system 100 may support dynamic resource sharing between traffic types, such as a dynamic allocation of resources between URLLC communications and eMBB communications, or other communications, according to different traffic types, categories, or other prioritization.

To support various resource allocation techniques, a base station 105 or other network entity (e.g., an entity of the core network 130, an entity of a distributed base station 105) may allocate uplink and/or downlink resources (e.g., an initial uplink resource allocation or an initial downlink resource allocation) to UEs 115, or groups of UEs 115, for uplink transmissions and/or downlink transmissions. In some examples, a base station 105 or other network entity may subsequently determine to perform a reallocation of the previously-allocated resources, which may be triggered, for example, by a determined or detected need, demand, or request to support higher-priority communications. Thus, a base station 105 or other network entity may generate and transmit a cancelation indication (e.g., an ULPI and/or a DLPI) that may correspond to at least a portion of the previously-allocated resources (e.g., as allocated to particular UEs 115). UEs 115 may be configured to monitor for ULPIs and DLPIs, and accordingly may determine, based at least in part on received, detected, or decoded ULPIs or DLPIs, whether or not to proceed with uplink transmissions and/or downlink reception using their previously-allocated uplink resources.

For example, a base station 105 may transmit physical downlink control channel (PDCCH) to schedule eMBB physical uplink shared channel (PUSCH) (e.g., to schedule a UE 115 with time and frequency resources for eMBB uplink). In some cases, uplink of both eMBB (e.g., low priority traffic) and URLLC (e.g., high priority traffic) may be grant-based (e.g., scheduled by DCI). Considering that the URLLC may require a faster timeline (e.g., faster N2 for UL scheduling) than eMBB, it may happen that some resources that are initially allocated to eMBB uplink may be reclaimed for URLLC. To reduce the interference imposed by the eMBB user on the URLLC user, the eMBB user may be asked to preempt its uplink transmission (e.g., via an ULPI monitored by the eMBB users).

For example, a base station 105 may transmit PDCCH to schedule eMBB PUSCH. Later, the base station 105 may identify traffic of another UE is of a first priority that is higher than a second priority of the uplink message (e.g., the base station may identify that another URLLC UE is to communicate traffic of higher priority than the previously scheduled UE). The base station 105 may then identify resources in the time domain, frequency domain, and/or spatial domain (e.g., one or more spatial directions and at least a portion of scheduled time and frequency resources) in which transmissions made by the UE are preempted (e.g., based on the identification that the traffic of the another UE is of the first priority that is higher than the second priority of the uplink message to be transmitted over the originally scheduled resources). In such cases, a base station may transmit a preemption indication (e.g., an ULPI), in a UE ULPI monitoring occasion, that may preempt transmission of the scheduled uplink message (e.g., ULPI may preempt the scheduled uplink message over a portion of the scheduled plurality of time and frequency resources). As such, in some cases, the another UE 115 may transmit URLLC PUSCH over the preempted resources.

According to one or more aspects of the techniques described herein, a UE 115 may ignore a preemption indication (e.g., a ULPI), such as when a preemption indication is meant to halt a random access message transmission associated with a certain type of random access procedure or when a preemption indication is meant to halt a random access procedure associated with certain triggering events. For example, a preemption configuration may indicate rules or instructions for application of a preemption indication for random access transmission. Thus, according to these and other examples, certain types of uplink resource allocations may be canceled, preempted, or reallocated, thereby supporting a dynamic redistribution of uplink resources in a wireless communication system, while some preemption indications may be disregarded or ignored to more-effectively balance the performance and resource utilization of communications according to different priorities.

Figure 2:
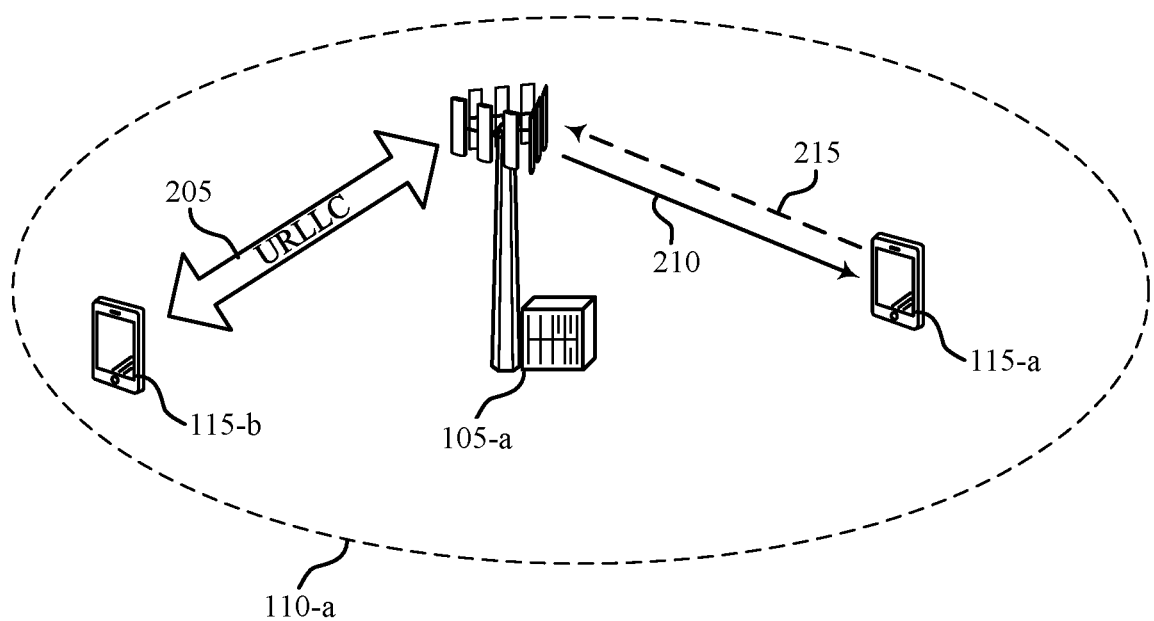
FIG. 2 illustrates an example of a wireless communications system that supports application of uplink preemption to random access transmission in accordance with aspects of the present disclosure.

FIG. 2 illustrates an example of a wireless communications system 200 that supports application of uplink preemption to random access transmission in accordance with aspects of the present disclosure. In some examples, wireless communications system 200 may implement aspects of wireless communications system 100. Wireless communications system 200 may include base station 105-a, UE 115-a, and UE 115-b, which may be examples of the corresponding devices described with reference to FIG. 1. In the example of FIG. 2, base station 105-a may support communications with multiple UEs (e.g., UE 115-a and UE 115-b) within a supported geographic coverage area 110-a. In some examples, the wireless communications system 200 may support mission critical applications that include stringent communication performance (e.g., reliability thresholds, latency thresholds) along with communications of other types.

In the wireless communications system 200, UE 115-a and/or UE 115-b may support various service deployments (e.g., such as URLLC service and eMBB service). For example, UE 115-b may support URLLC transmission (e.g., over communication link 205) to reduce end-to-end latency for data transmission and reception associated with the base station 105-a. In some examples, the UE 115-b may correspond to a URLLC UE that supports or is otherwise configured for transmissions, such as periodic transmissions, of relatively small data packets. For example, the UE 115-b may include a URLLC UE that supports operations and data communication associated with factory automation (e.g., automated manufacturing, supply chain management), transport (e.g., vehicle-to-vehicle (V2V) communications, vehicle-to-infrastructure (V2I) communications), or electrical power distribution (e.g., power grid networking) within a supported area or locale, among other possible implementations.

Further, base station 105-a may support communications with other UEs (e.g., such as UE 115-a) that support eMBB transmissions associated with high data rates across wide coverage areas (such as geographic coverage area 110-a). In some examples, compared to URLLC communications, eMBB communications may be associated with relatively relaxed (e.g., longer) latency targets or thresholds, lower reliability targets or thresholds, or both. Moreover, one or more of UE 115-a and UE 115-b may support data communications associated with multiple service deployments (such as URLLC and eMBB), as part of an intra-UE or inter-UE operation.

As such, according to the described techniques, a base station 105-a, or other network entities, may allocate uplink and/or downlink resources (e.g., in the time domain, frequency domain, spatial domain) to UEs 115, or groups of UEs, that may be subsequently reallocated. For example, a base station 105-a may determine a reallocation of uplink resources and/or downlink resources, and may issue a preemption indication (e.g., an ULPI, a DLPI, a cancellation indication, etc.) that may correspond to at least a portion of previously-allocated resources. UEs 115 (e.g., UE 115-a and UE 115-b) may be configured to monitor for such preemption indications, and based on received preemption indications, UEs 115 may determine whether or not to proceed with an uplink transmission or downlink reception using their previously-allocated resources. In some cases, a preemption configuration (e.g., rules for application of preemption indications) may be identified by a UE 115 and/or base station 105 based on traffic prioritization, preemption indication prioritization, types of scheduled signals to be transmitted by the UE 115, types of unscheduled signals to be transmitted by the UE 115, etc.

That is, to support the conditions associated with some service deployments (e.g., URLLC and eMBB service deployments, or other types of resource allocation based on communication prioritization), the base station 105-a and the UEs 115-a and 115-b may support various techniques for dynamic uplink resource allocations and application of uplink preemption to random access transmission described herein. For example, the base station 105-a may be configured to transmit an ULPI 210 based at least in part on determining a reallocation of uplink resources (e.g., associated with uplink resources allocated to UE 115-b for communication link 205), and UEs 115 (e.g., UE 115-a) may monitor for such ULPIs 210 to determine how they should proceed with uplink communications. In other words, the UEs 115 may be notified about preempted (e.g., or canceled) uplink resources in the time domain, frequency domain, and/or spatial domain. According to various examples, UEs 115 receiving ULPI 210 (e.g., such as UE 115-a) may perform uplink communication determinations such as determining whether to perform or proceed with uplink transmissions or determining to refrain from or preempt uplink transmissions (e.g., based on resources indicated by the ULPI 210, based on a preemption configuration corresponding to the received ULPI 210, etc.).

ULPIs 210 may be signaled by the base station 105-a to UEs 115 (e.g., to UE 115-a, to some a group of UEs 115) according to various techniques. For example, a UE 115 may be configured to monitor for ULPIs according to various signaling by the base station 105-a, such as various types of downlink control signaling, physical channel signaling, cell-specific signaling, and others. In some examples, ULPIs 210 may be conveyed in downlink control information (DCI) over a PDCCH, which may support UE-specific ULPIs. In some examples, a UE 115 may be configured (e.g., by the base station 105-a) with a radio network temporary identifier (RNTI) for monitoring a PDCCH that may be carrying ULPIs 210. In some cases, a UE 115 may be configured with an RNTI that is common between uplink and downlink preemption indications, or different between uplink and downlink preemption indications.

In accordance with aspects of the techniques described herein, in different scenarios, it may or may not be efficient for some transmissions (e.g., random access messages 215) to be terminated if ULPI 210 is received by a UE 115-a. That is, in general, the allowance or preemption of random access message 215 transmission in different random access scenarios (e.g., random access message 215 transmission for CFRA procedures versus random access message 215 transmission CBRA procedures) may, in some cases, impact efficient prioritization of communications within wireless communications system 200 (e.g., such that tradeoffs between reallocation of previously allocated resources for high priority communications and resulting random access message 215 preemption may be considered).

For example, in some cases, UE 115-a may have previously established an RRC connection with base station 105-a, and UE 115-a may receive an ULPI 210 indicating that at least a portion of a CFRA resource is being preempted. In such cases, it may be efficient for the UE 115-a to preempt transmission of the random access message 215 (e.g., as the base station 105-a may have prior knowledge of the UE 115-a priority, of priority associated with communications supported or employed by the UE 115-a, etc., based on the previously established RRC connection). Alternatively, UE 115-*a* may not have previously established an RRC connection with base station 105-*a* (e.g., UE 115-*a* may be attempting initial access the wireless communications system 200), and UE 115-*a* may receive an ULPI 210 indicating that at least a portion of a CBRA resource is being preempted. In such cases, it may be efficient for the UE 115-*a* to transmit the random access message 215 (e.g., ignore, disregard, or override the ULPI 210), as the base station 105-*a* may have relatively less (or no) prior knowledge of the UE 115-*a* priority, of priority associated with communications supported or employed by the UE 115-*a*, etc. That is, in cases where ULPI 210 indicates that at least a portion of a CBRA resource is preempted, it may be efficient for UE 115-*a* to proceed with the CBRA message 215 regardless (e.g., as in such scenarios base station 105-*a* may be unaware whether UE 115-*a* will support ULPIs 210, as UE 115-*a* supported services or communications may alter efficient dynamic resource allocation and ULPI 210 usage by base station 105-*a*, etc.).

Accordingly, the described techniques provide for efficient preemption configuration for UEs 115. Preemption configurations may provide for more efficient resource utilization and resource allocation within a wireless communications system supporting various service deployments. Specifically, aspects of the described preemption configurations may provide for efficient handling of ULPIs 210 for random access message 215 transmissions, based on whether the random access message 215 is transmitted as part of a CFRA procedure or a CBRA procedure. Further, aspects of the described preemption configurations may provide for efficient handling of ULPIs 210 based on random access triggering conditions (e.g., based on what events or circumstances trigger random access message 215 transmission by a UE 115).

Wireless communications systems (e.g., wireless communications system 200) may employ preemption configurations (e.g., uplink preemption applicability rules, rules for application of ULPIs 210, etc.) to balance tradeoffs between reallocation of previously allocated resources for high priority communications and certain random access message 215 preemption ramifications. As such, UEs 115 may be configured with a preemption configuration, and may handle ULPIs 210 (e.g., may transmit a random access message 215 or preempt transmission of a random access message 215) in accordance with the preemption configuration. Generally, a preemption configuration may refer to a configuration of whether to transmit or preempt a random access message 215 based on a type of procedure the random access message 215 is associated with (e.g., a CFRA procedure or a CBRA procedure), based on conditions triggering the transmission of the random access message 215 (e.g., initial access triggering, beam failure recover triggering, etc.), etc.

In some cases, UEs 115 may be preconfigured with a preemption configuration. In some cases, aspects of preemption configuration (e.g., one or more rules for whether ULPI 210 received by a UE 115 applies to a certain random access message 215) may be dynamically configurable. For example, in some cases base station 105-*a* may configure rules for application of ULPIs 210 in RRC signaling, in the ULPI 210 itself (e.g., the ULPI 210 may be associated with a priority that the UE 115 may use to determine whether or not the ULPI applies based on a priority of the random access message 215), etc.

As discussed herein, a preemption configuration may selectively preempt random access channel (RACH) transmissions (e.g., random access message 215 transmissions) based on whether the RACH transmission (e.g., the random access message 215 transmission with at least a portion of a corresponding random access resource being preempted by ULPI 210) is part of a CBRA procedure or a CFRA procedure. For example, ULPI 210 may only apply to (e.g., preempt) CFRA, and may not apply to CBRA. Specifically, in 4-step RACH, ULPI 210 may apply to CFRA (e.g., a CFRA random access preamble), and may not apply to CBRA (e.g., a CBRA random access preamble and CBRA message3). In 2-step RACH, ULPI 210 may apply to contention free 2-step RACH (e.g., both preamble and data), but may not apply to contention-based 2-step RACH. ULPI 210 may not apply to message3 transmissions, or message3 retransmissions, scheduled by PDCCH scrambled by temporary cell radio network temporary identifier (TC-RNTI) (e.g., because base station 105-*a* may be unaware of whether the UE that sends the preamble can support ULPI or not).

Further, a preemption configuration may selectively preempt RACH transmissions (e.g., random access message 215 transmissions) based on the triggering event (e.g., based on a condition triggering) that triggers the RACH transmission (e.g., the random access message 215 transmission with at least a portion of a corresponding random access resource being preempted by ULPI 210). For example, RACH triggering events for or by a UE 115 may include initial access from an RRC_IDLE state, RRC Connection Re-establishment procedure, downlink or uplink data arrival during RRC_CONNECTED when uplink synchronization status is "non-synchronized," uplink data arrival during RRC_CONNECTED when there are no physical uplink control channel (PUCCH) resources for scheduling request (SR) available, SR failure, request by RRC upon synchronous reconfiguration (e.g., handover), transition from RRC_INACTIVE, timing alignment establishment at the addition of a secondary cell (SCell), request for Other system information (SI), beam failure recovery, etc.

According to aspects of the techniques described herein, a preemption configuration may be employed such that ULPI 210 may apply to RACH that is triggered by PDCCH order, beam failure recovery, a request for Other SI, a request for uplink resource (e.g., when no SR is available), a SR failure, or some combination thereof. ULPI 210 may not apply to RACH that is triggered by initial access, transition from RRC_INACTIVE state (e.g., to RRC_CONNECTED state), mobility (e.g., handover), timing advance (TA) establishment for SCell addition, uplink TA re-establishment, RRC connection re-establishment, or some combination thereof.

For example, ULPI 210 may not apply to RACH triggered by initial access or a transition from RRC_INACTIVE state because in such cases the UE may be less likely to be monitoring for ULPI 210 (e.g., a UE 115 may only be monitoring for ULPI when in an RRC_CONNECTED state). The ULPI 210 may not apply to RACH triggered by mobility (e.g., handover), as the ULPI 210 may be applicable for the current cell and the UE receiving the ULPI 210 may not be monitoring ULPI in the target cell (e.g., the ULPI 210 may not be applicable to the target cell the UE is being handed over to). The ULPI 210 may not apply to RACH triggered by TA establishment for SCell addition, as in such cases the UE may not monitor ULPI for the new SCell. Further, the ULPI 210 may not apply to RACH triggered by uplink TA re-establishment, as without a correct TA the ULPI may not be accurate (e.g., without a correct TA the UE may not be able to accurately apply the ULPI).

In some examples, a preemption configuration may selectively preempt RACH transmissions (e.g., random access message 215 transmissions) based on a cell associated with the random access procedure. For example, a preemption configuration may specify that UE 115-a is to apply ULPI 210 to RACH transmissions in a secondary serving cell (e.g., SCell), but that the UE 115-a may not apply the ULPI 210 to RACH transmissions in a primary cell (PCell). Generally, a preemption configuration may indicate whether or not ULPI 210 applies to random access procedures in different cells (e.g., such as that ULPI applies to random access message 215 in one or more secondary serving cells, but that ULPI does not apply to random access messages 215 in a primary cell).

If ULPI 210 indicates that a part of the RACH preamble transmission is to be preempted (e.g., if ULPI 210 indicates that at least a portion of a random access resource is being preempted) and the preemption configuration indicates the RACH preamble transmission is to be preempted (e.g., if the random access message 215 is part of a CFRA procedure, if the random access message 215 is triggered by beam failure recovery or SR failure, etc.), the UE 115 may drop the whole RACH transmission. For example, preemption (e.g., RACH dropping) may be indicated on a slot-basis and, in cases where the RACH preamble spans more than one slot (e.g., including one or more slots indicated by the ULPI), the UE may drop the whole RACH transmission over more than one slot spanned by the RACH preamble. That is, in some cases (e.g., for some preemption configurations), if any symbol of a random access message 215 is preempted (e.g., in accordance with the preemption configuration rules), the whole random access message 215 is canceled (e.g., over all symbols of the random access resource associated with the random access message 215).

If a RACH preamble is preempted by ULPI 210 (e.g., based on the preemption configuration and the CFRA/CBRA type and/or triggering event of the random access message 215), the UE may not ramp up its power, the UE may not increase its preamble_power_ramping_counter, nor may the UE increase its preamble_transmission_counter (e.g., as the RACH preamble is preempted, and the RACH preamble was thus not associated with a failed transmission to the base station 105-a). In cases where RACH is initiated by the UE, the UE may use a next immediate available RACH resource to transmit the RACH preamble, without performing time backoff. In cases where RACH is scheduled by a PDCCH order, the UE may wait for the next PDCCH order.

Using the described techniques, various other implementations may be considered and would be readily realized by analogy, without departing from the scope of the present disclosure. For example, aspects of preemption configuration described herein may generally apply to other types of uplink transmissions, other preemption indications (e.g., other cancelation indications, such as DLPIs), preemption indications that may include different lengths of bit sequences (e.g., to convey more granular or less granular preemption information), etc.

Figure 3A:
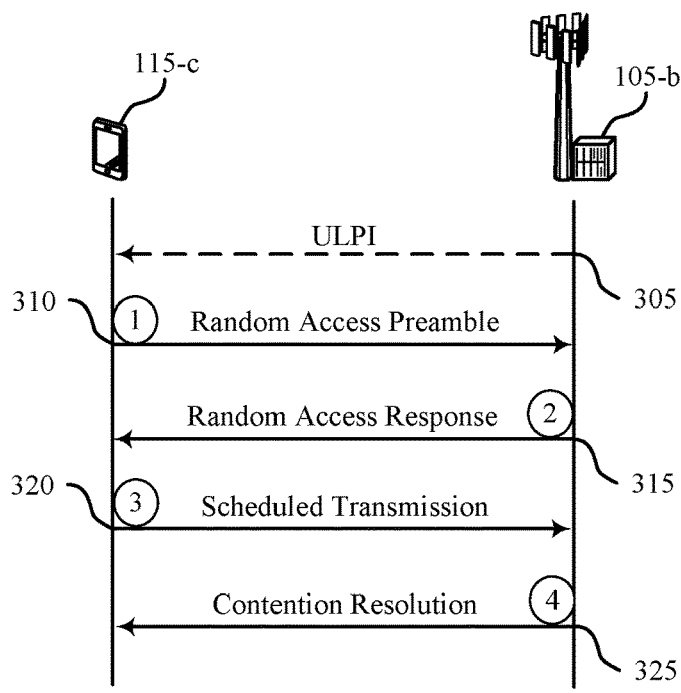
FIGS. 3A and 3B illustrate example process flows that support application of uplink preemption to random access transmission in accordance with aspects of the present disclosure.
Figure 3B:
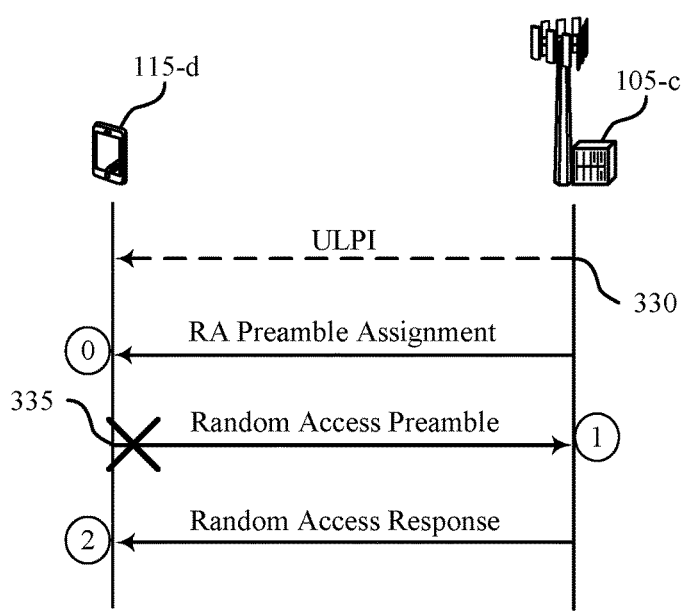

FIGS. 3A and 3B illustrate example process flows that support application of uplink preemption to random access transmission in accordance with aspects of the present disclosure. For example, FIG. 3A illustrates an example process flow 300 for a CBRA procedure, and FIG. 3B illustrates an example of a process flow 301 for a CFRA procedure. In some examples, process flow 300 and process flow 301 may illustrate aspects of techniques supported by wireless communications system 100 and/or wireless communications system 200. For example, process flow 300 and process flow 301 may illustrate UE 115 handling of ULPIs from a base station 105 in accordance with a preemption configuration, where the base stations 105 and UEs 115 may be examples of the corresponding devices described with reference to FIGS. 1 and 2.

FIG. 3A illustrates an example process flow 300 for a CBRA procedure. As discussed herein, a preemption configuration corresponding to an ULPI may not apply (e.g., not preempt) random access messages associated with a CBRA procedure. That is, in cases where an ULPI indicates that at least a portion of a CBRA resource is being preempted, UE 115-c may not apply the ULPI and may transmit the random access message associated with the CBRA resource in accordance with the CBRA procedure.

For example, at 305, base station 105-b may transmit an ULPI to UE 115-c, where the ULPI may indicate that at least a portion of a random access resource (e.g., associated with a random access preamble at 310 and/or a message3/scheduled transmission at 320) is being preempted. UE 115-c may identify a preemption configuration corresponding to the ULPI, and may not apply the ULPI in accordance with the preemption configuration. As such, UE 115-c may transmit a random access preamble at 310, receive a random access response at 315, transmit a message3/scheduled transmission at 320, and receive a contention resolution message at 325. In some cases, as discussed herein, the CBRA procedure illustrated by process flow 300 may be triggered by UE 115-c initial access or UE 115-c transition from an RRC_INACTIVE state. As the base station 105-b may have little to no knowledge of the UE 115-c (e.g., of the UE 115-c configuration, or the services supported by UE 115-c, of whether UE 115-c is monitoring for ULPIs, etc.) prior to or during initial access, the preemption configuration specifying the ULPI is not applied to such CBRA transmissions may be associated with increased system efficiency, as described in more detail herein. For example, since the base station 105-b may have little to no knowledge of the UE 115-c, it may not be reasonable for the base station 105-b to schedule an URLLC transmission on the contention-based PRACH resources, since it is not guaranteed that UE 115-c (e.g., which is configured to transmit CBRA on these PRACH resources) will be able to monitor the ULPI and hence preempt transmissions. As such, the preemption configuration specifying that UE 115-c may not preempt CBRA RACH transmissions may imply that the base station 105-b may not schedule URLLC uplink transmission on a CBRA PRACH resource, and hence it may improve the reliability of URLLC.

FIG. 3B illustrates an example process flow 301 for a CFRA procedure. As discussed herein, a preemption configuration corresponding to an ULPI may apply (e.g., preempt) random access messages associated with a CFRA procedure. That is, in cases where an ULPI indicates that at least a portion of a CFRA resource is being preempted, UE 115-d may apply the ULPI and may preempt transmission of random access message associated with the CFRA.

For example, at 330, base station 105-c may transmit an ULPI to UE 115-d, where the ULPI may indicate that at least a portion of a random access resource (e.g., associated with a random access preamble at 335) is being preempted. UE 115-d may identify a preemption configuration corresponding to the ULPI, and may apply the ULPI in accordance with the preemption configuration. As such, in cases where an ULPI is received by UE 115-d at 330, UE 115-c may preempt transmission of (e.g., cancel) a random access preamble at 335 (e.g., in such cases, a random access response may thus not be transmitted by base station 105-c). In some cases, as discussed herein, the CFRA procedure illustrated by process flow 301 may be triggered by UE 115-d mobility (e.g., handover of UE 115-d), UE 115-d beam failure recovery, UE 115-d SI request, may be PDCCH ordered, etc. As the base station 105-c may have prior knowledge of the UE 115-d (e.g., of the UE 115-d configuration, or the services supported by UE 115-d, of whether UE 115-d is monitoring for ULPIs, etc.) as the UE 115-d may already have been connected to the base station 105-c, the preemption configuration specifying the ULPI is applied to such CFRA transmissions may be associated with increased system efficiency, as described in more detail herein. In such cases, if the base station 105-c sends ULPI to the UE 115-d, the base station 105-c may know that the UE 115-d will be able to monitor ULPI and apply ULPI. Hence, it is safe (e.g., in terms of guarantying the URLLC reliability) for the base station 105-c to schedule URLLC transmission on a contention-free RACH resource.

Figure 4:
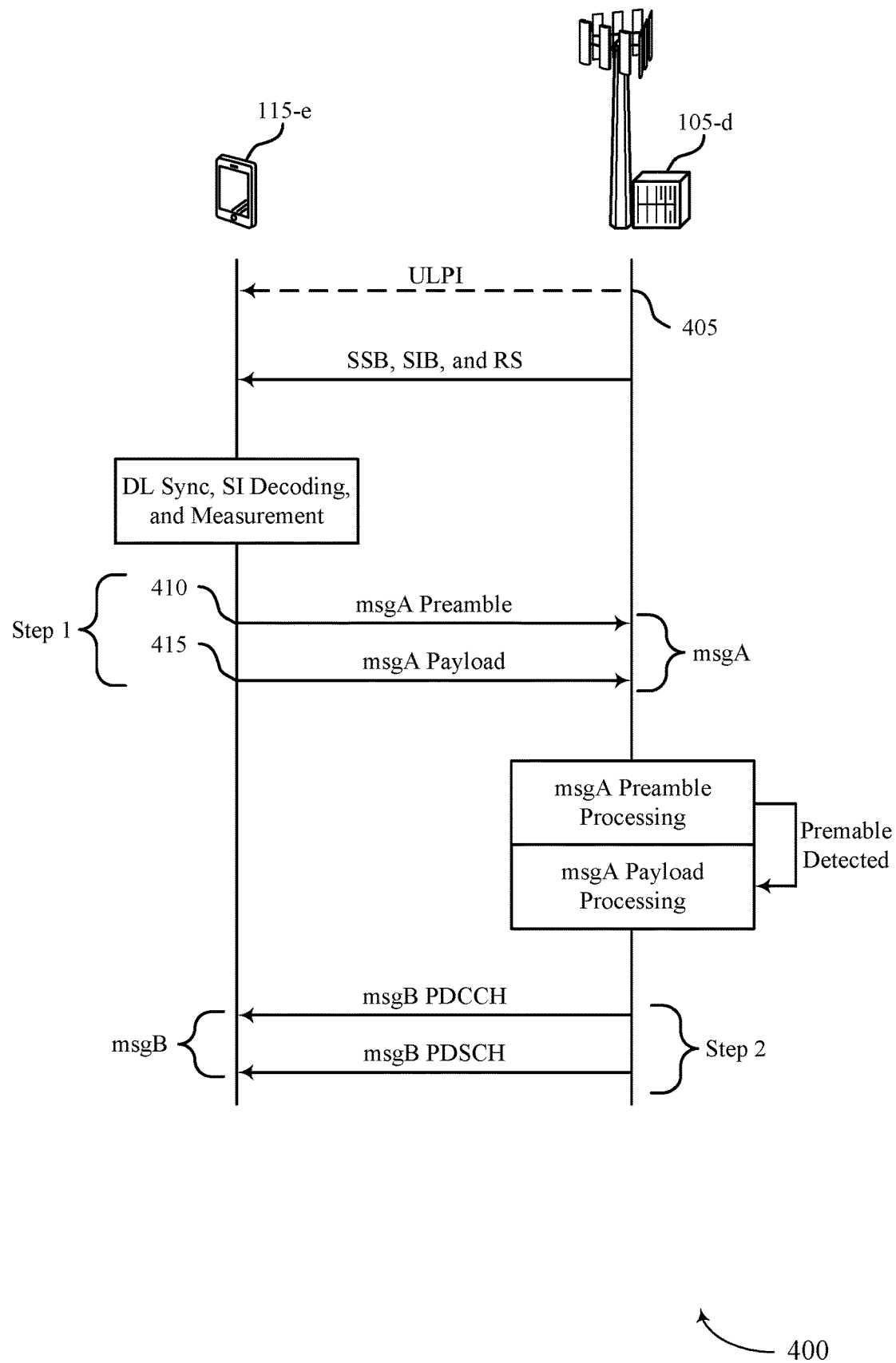
FIG. 4 illustrates an example of a process flow that supports application of uplink preemption to random access transmission in accordance with aspects of the present disclosure.

FIG. 4 illustrates an example of a process flow 400 that supports application of uplink preemption to random access transmission in accordance with aspects of the present disclosure. In some examples, process flow 400 may implement aspects of wireless communications system 100 and/or wireless communications system 200. Process flow 400 may include base station 105-d and UE 115-e, which may be examples of the corresponding devices described with reference to FIGS. 1 and 2. Process flow 400 may illustrate 2-step physical random access channel (PRACH) or 2-step RACH.

2-step RACH may be employed to reduce latency of RACH procedures. 2-step RACH may be contention based (e.g., a CBRA procedure), however, some wireless communications systems may support contention free 2-step RACH. In 2-step RACH, UE 115-e may send a msgA preamble (e.g., which may be similar or analogous to message1 in 4-step RACH) and a msgA payload (e.g., which may be similar or analogous to message3 in 4-step RACH) without waiting for signaling between the msgA preamble and msgA payload (e.g., without waiting for signaling similar or analogous to message2 in 4-step RACH). In some cases, 2-step RACH may be triggered in a same or similar manner as 4-step RACH (e.g., a 2-step CBRA procedure may be associated with the same or similar triggering events as a 4-step CBRA procedure, and a 2-step CFRA procedure may be associated with the same or similar triggering events as a 4-step CFRA procedure).

At 405, base station 105-d may transmit an ULPI to UE 115-e, where the ULPI may indicate that at least a portion of a random access resource (e.g., associated with transmission of a msgA preamble at 410 and/or transmission of a msgA payload at 415) is being preempted. The UE 115-e may identify a preemption configuration corresponding to the ULPI, and may transmit or preempt transmission of a random access message (e.g., a msgA preamble at 410 and/or a msgA payload at 415) based at least in part on the preemption configuration (e.g., in accordance with the preemption configuration). For example, in cases where the 2-step RACH of process flow 400 is a 2-step CBRA procedure, the UE 115-e may not apply the ULPI and may transmit the msgA preamble at 410 and/or the msgA payload at 415 associated with the CBRA resource in accordance with the 2-step CBRA procedure. In cases where the 2-step RACH of process flow 400 is a 2-step CFRA procedure, the UE 115-e may apply the ULPI and may preempt transmission of (e.g., cancel) the msgA preamble at 410 and/or the msgA payload at 415 associated with the CFRA resource. In cases where UE 115-e applies the ULPI and preempts transmission of the msgA preamble at 410 and/or the msgA payload at 415, msgA preamble/msgA processing and msgB PDCCH/msg physical downlink shared channel (PDSCH) transmission may thus not be performed by base station 105-d.

Additionally or alternatively, as discussed herein, UE 115-e may apply the ULPI based on the triggering event of (e.g., based on a condition triggering) the 2-step RACH procedure, in accordance with the preemption configuration. For example, as discussed herein, a preemption configuration may be employed such that ULPI may apply to 2-step RACH procedures triggered by PDCCH order, beam failure recovery, a request for Other SI, a request for uplink resource (e.g., when no SR is available), a SR failure, or some combination thereof. Further, ULPI may not apply to 2-step RACH procedures triggered by initial access, transition from RRC_INACTIVE state (e.g., to RRC_CONNECTED state), mobility (e.g., handover), timing advance (TA) establishment for SCell addition, uplink TA re-establishment, RRC connection re-establishment, or some combination thereof.

Figure 5A:
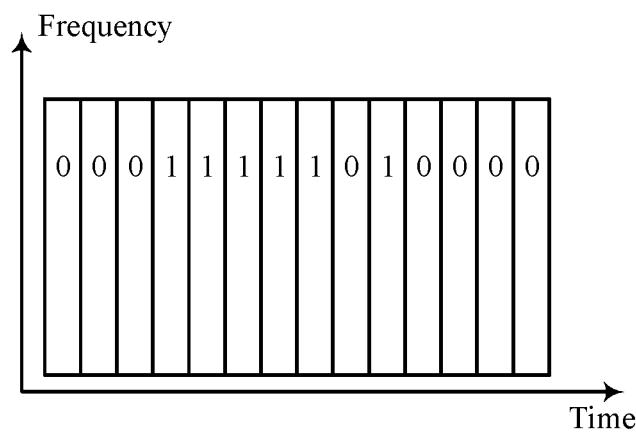
FIGS. 5A and 5B illustrate example uplink preemption indication (ULPI) diagrams that support application of uplink preemption to random access transmission in accordance with aspects of the present disclosure.
Figure 5B:
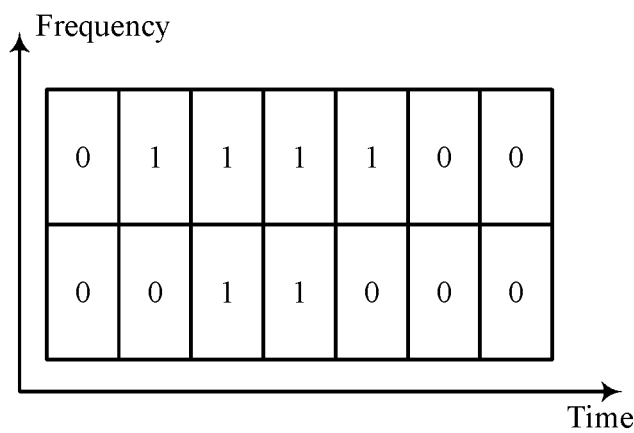

FIGS. 5A and 5B illustrate example ULPI diagrams that support application of uplink preemption to random access transmission in accordance with aspects of the present disclosure. FIG. 5A illustrates an example ULPI diagram 500 and FIG. 5B illustrates an example ULPI diagram 501. In some examples, wireless communications system 100 and/or wireless communications system 200 may implement aspects of ULPI diagram 500 and/or ULPI diagram 501.

As discussed herein, to preempt certain resources (e.g., previously allocated resources, such as previously allocated eMBB resources) from being used (e.g., to reclaim previously allocated resources for other communications, such as for URLLC) ULPI may be used. In some cases, ULPI may refer to a bit sequence in DCI. For example, bits of an ULPI may be used to indicate preemption of time and frequency resources. For example, ULPI may include (e.g., or refer to, be configured as, etc.) a 14 bit sequence in DCI. A UE receiving the ULPI may know which resources are being indicated by the ULPI for preemption based on a configuration of the ULPI. For example, a bit sequence or bitmap of the ULPI may include bits corresponding to a set of communication resources in the time domain and/or a set of communication resources in the frequency domain. For example, ULPI diagram 500 may illustrate an ULPI configuration, ULPI correspondence, ULPI mapping, etc., where bits of the bit sequence indicate preemption to a set of communication resources in the time domain. ULPI diagram 501 may illustrate an ULPI configuration, ULPI correspondence, ULPI mapping, etc., where bits of the bit sequence indicate preemption to a set of communication resources in the time domain and frequency domain. For example, a value of '1' in the ULPI bit sequence may indicate the corresponding resource (e.g., in time and/or frequency) is preempted, and a value of '0' in the ULPI bit sequence may indicate the corresponding resource (e.g., in time and/or frequency) is not preempted (e.g., in unaffected, is the same as was previously allocated, etc.).

A UE receiving the ULPI may identify preempted resources based on preemption information (e.g., '1' values in the ULPI bit sequence) and resources corresponding to the preemption information (e.g., where the ULPI resource correspondence may be preconfigured, configured via RRC, implicit based on the signaling of the ULPI, etc. That is, the ULPI bit sequence may include or indicate a bit sequence or a bitmap associated with a set of communication resources in the time domain and/or frequency domain (e.g., and a receiving UE may determine whether at least a portion of a random access resource corresponds to one or more of the subsets of the communication resources for which preemption is indicated by the bitmap). As such, a UE may identify or determine when the ULPI indicates that at least a portion of a random access resource is being preempted based on when resources preempted by the ULPI align with or overlap with random access resources. According to the techniques described herein, once the UE receives ULPI that indicates at least a portion of a random access resource is being preempted, the UE may apply or not apply the ULPI in accordance with a preemption configuration.

As discussed herein, ULPIs may be supported by communications systems as a mechanism to enable dynamic multiplexing between different service types (e.g., between eMBB and URLLC transmissions). In some cases, ULPI may be referred to as an uplink cancellation indication. In some cases, a base station may indicate ULPIs through a group-common DCI to one or more eMBB users. The ULPIs may indicate a set of uplink resources on which the resources are not available for eMBB transmission (e.g., the resources indicated by the ULPI may be the resources on which URLLC uplink transmissions may be scheduled by the base station). A UE may receive the DCI, and may determine a set of resources indicated by the ULPI for preemption. The UE may compare the resources indicated for preemption to resources scheduled for its own transmission (e.g., the UE may compare resources indicated for preemption by the ULPI to its own random access resources). If the UEs scheduled resource overlaps with the set of resources indicated in the group-common DCI, the UE may preempt eMBB PUSCH transmissions. As discussed herein, the described techniques may provide for a UE applying the ULPI to any resources indicated in the group-common DCI that overlap with the UEs random access resources according to a preemption configuration.

Figure 6:
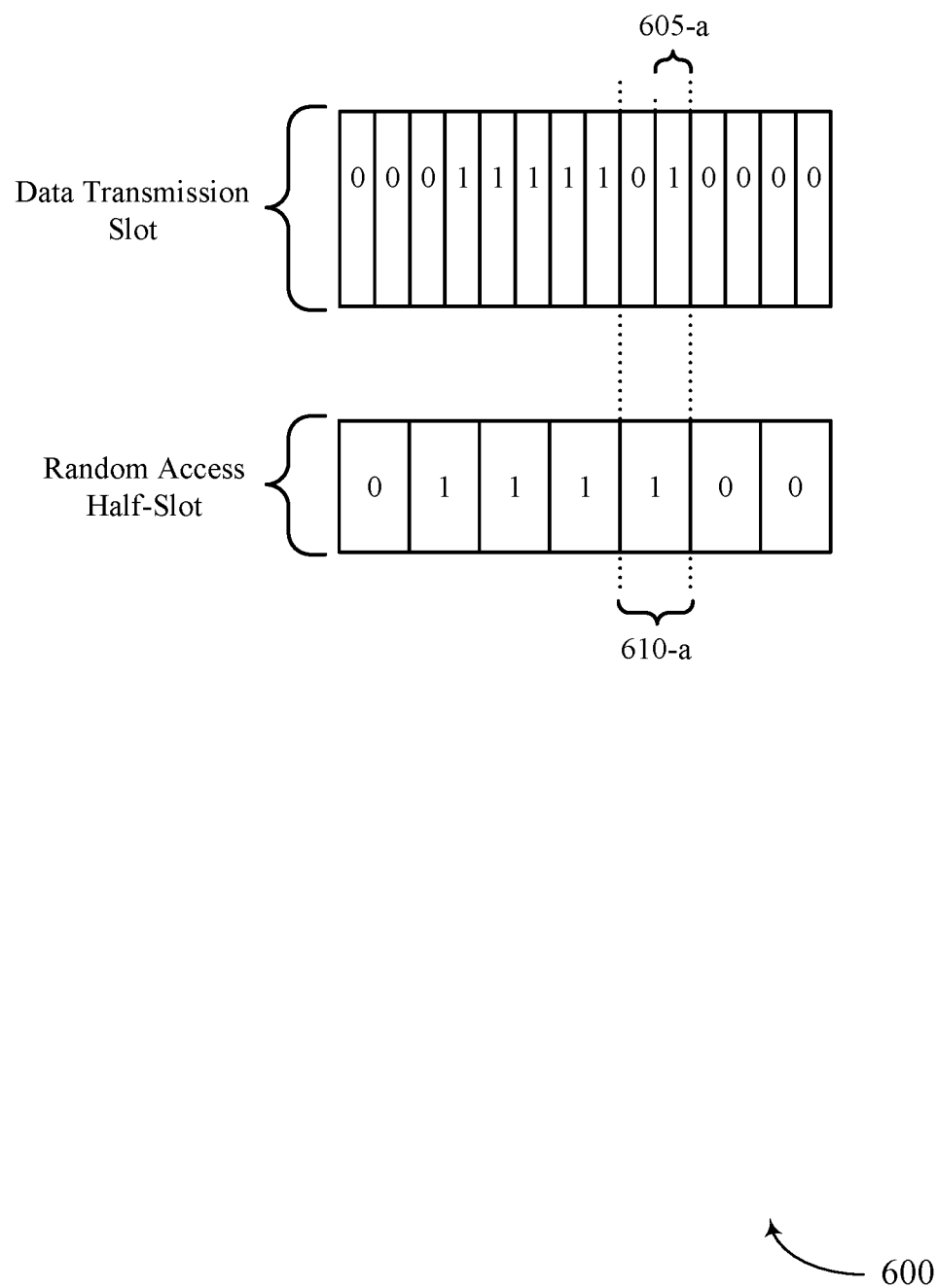
FIG. 6 illustrates an example of an ULPI diagram that supports application of uplink preemption to random access transmission in accordance with aspects of the present disclosure.

FIG. 6 illustrates an example of an ULPI diagram 600 that supports application of uplink preemption to random access transmission in accordance with aspects of the present disclosure. In some examples, wireless communications system 100 and wireless communications system 200 may implement aspects of ULPI diagram 600. For example, ULPI diagram 600 may illustrate subcarrier spacing (SCS) considerations for identifying when ULPI indicates preempted resources that align with (or overlap with) resources previously allocated to or scheduled for a UE. Specifically, ULPI diagram 600 may illustrate an example where a SCS for resources indicated by ULPIs is different than a SCS for random access resources.

In some cases, ULPIs may be configured to be associated with particular communication resources in the time domain (e.g., which may, in some cases, be preconfigured, be configured by RRC configuration by a base station, be configured by the preemption configuration, or other configuration). In some examples, resources in the time domain for which preemption may be applied (e.g., corresponding to a ULPI) may be indicated in symbol-level intervals (e.g., symbol durations, OFDM symbol durations, etc.). For example, ULPIs may indicate resources for which preemption may be applied in sets of 7-symbol durations, sets of 14-symbol durations, or resources may be indicated in sub-slots (e.g., such as 7 sub-slots each having a length of two symbol durations or four symbol durations), etc. Such divisions or partitioning may be referred to as a granularity of resources in the time domain for preemption. For example, in some cases, a 14 bit ULPI may indicate resources for which preemption may be applied over a set of 14 symbols (e.g., a slot), where each bit corresponds so a respective symbol across the 14-symbol slot duration. In other examples, a 14 bit ULPI may indicate resources for which preemption may be applied over a set of 28 symbols (e.g., two slots), where each bit corresponds so a respective symbol pair across the 28-symbol duration. Various other preemption indication (e.g., ULPI) configurations may be considered and would be readily realized by analogy, without departing from the scope of the present disclosure. That is, generally ULPIs may include various lengths of bit sequences, and each bit may correspond to resources of varying size (e.g., such as one symbol, two symbols, half a symbol, etc.), to convey more granular or less granular preemption information for various applications.

In some examples, SCS for a RACH preamble transmission in an active bandwidth part (BWP) of a serving cell may be different from the SCS of the same BWP of the serving cell that is used to transmit uplink data. For example, a symbol duration 605 of a slot for data transmission may be different from a symbol duration 610 of a slot for random access transmissions (e.g., RACH preamble transmissions). In the example of FIG. 6, a full slot of data transmission resources are shown (e.g., a slot with a SCS of 30 k Hz and symbol durations 605) on top of a half RACH slot of random access resources (e.g., a half slot with a SCS of 15 k Hz and symbol durations 610).

For example, a slot in which RACH preamble is transmitted may be referred to as a RACH slot. In cases where SCS for a RACH preamble transmission is different from the SCS of the serving that is used to transmit uplink data (e.g., of a same BWP), a UE may interpret ULPI using SCS of the data channel of the same BWP/serving cell (e.g., the UE may interpret resources being preempted by ULPI using a SCS associated with a data transmission slot numerology. In cases where the RACH SCS is lower than the data SCS, one symbol (e.g., one OFDM symbol) in the RACH slot may be equal (e.g., or overlap with) more than one symbol (e.g., more than one OFDM symbol) in non-RACH slot (e.g., in a slot associated with data transmission, and thus associated with ULPI). In such cases, a UE may preempt a RACH symbol as long as any corresponding non-RACH symbol is indicated to be preempted. For example, in the example of FIG. 6, if a symbol duration 605-a is indicated as being preempted by ULPI, a UE may interpret the ULPI as preempting a symbol duration 610-a corresponding to the symbol duration 605-a. The symbol duration 610-a (e.g., RACH symbol) may correspond to two symbol durations 605 (e.g., including symbol duration 605-a) in the SCS of the data channel. In such examples, the UE may identify that the ULPI indicates at least a portion of the random access resource (e.g., half of the symbol duration 610-a) is preempted, and the UE may apply (e.g., or not apply) the ULPI for the random access resource (e.g., for the symbol duration 610-a) according to the preemption configuration, in accordance with the techniques described herein.

Figure 7A:
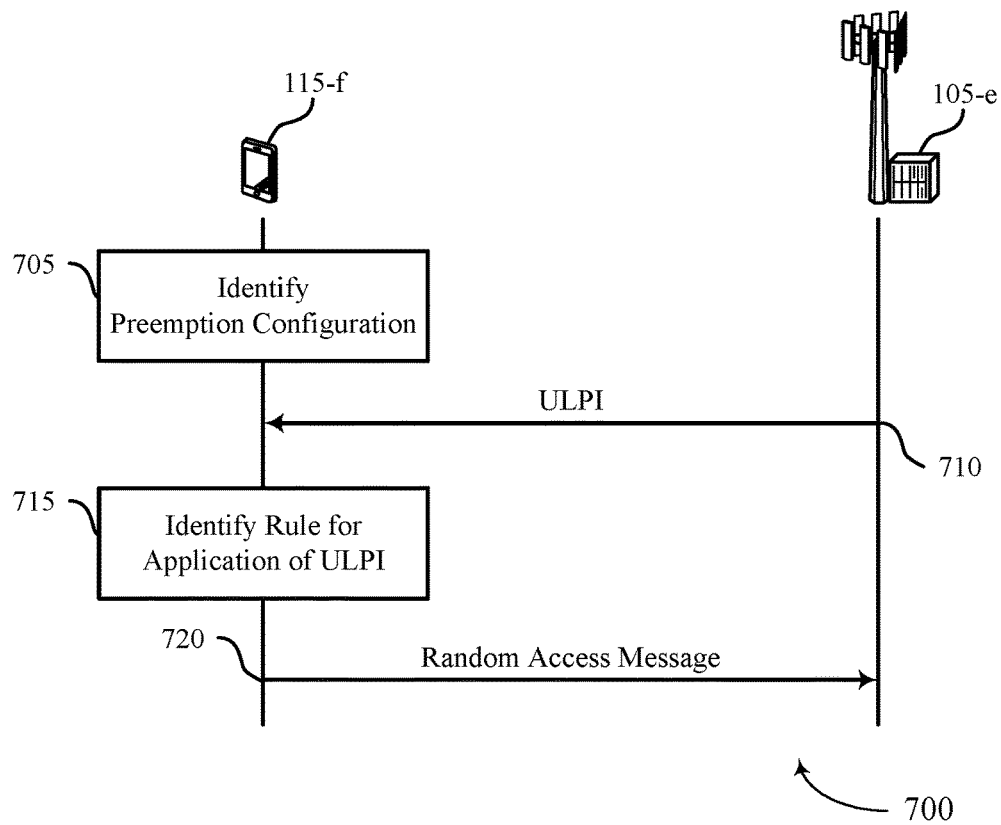
FIGS. 7A and 7B illustrate example process flows that support application of uplink preemption to random access transmission in accordance with aspects of the present disclosure.
Figure 7B:
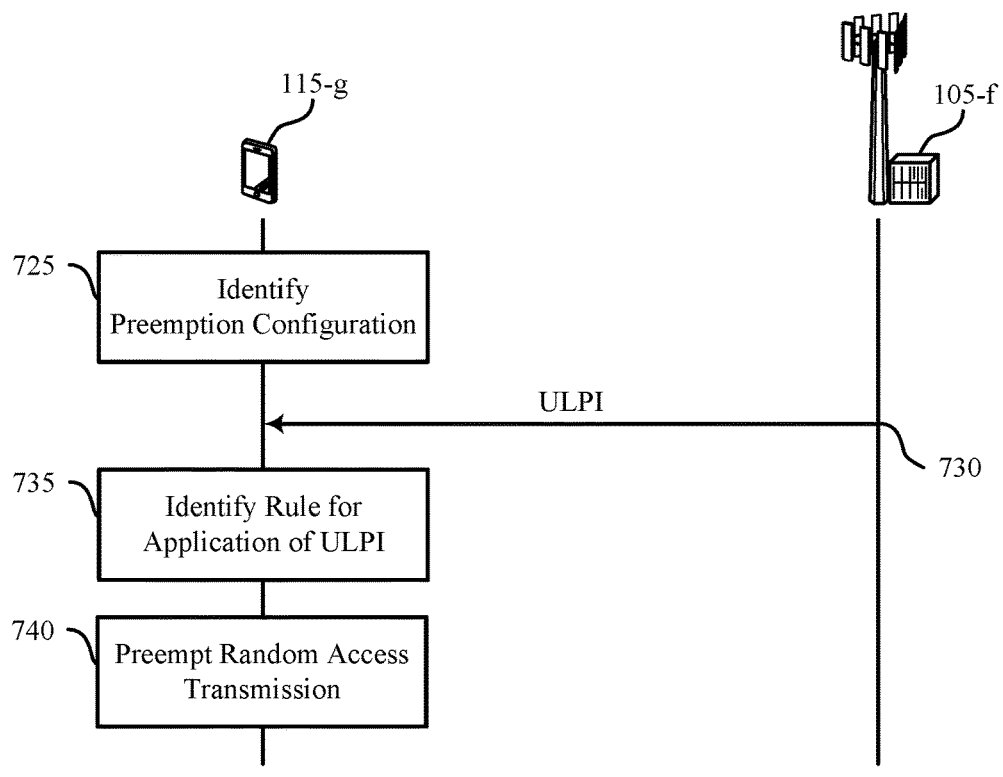

FIGS. 7A and 7B illustrate example process flows that support application of uplink preemption to random access transmission in accordance with aspects of the present disclosure.

FIG. 7A illustrates an example process flow 700 for scenarios where a UE 115 does not preempt transmission of a random access message (e.g., where a UE 115 does not apply or adhere to an ULPI) in accordance with a preemption configuration. For example, process flow 700 may illustrate scenarios where ULPI indicates that at least a portion of a random access resource associated with a CBRA procedure is preempted, scenarios where ULPI indicates that at least a portion of a random access resource associated with a random access procedure triggered by initial access is preempted, etc.

In some examples, process flow 700 may implement aspects of wireless communications system 100 and/or wireless communications system 200. Further, process flow 700 may be implemented by a UE 115-*f* and a base station 105-*e*, which may be examples of a UE 115 and a base station 105 described with reference to FIGS. 1-6. In the following description of the process flow 700, the operations between UE 115-*f* and base station 105-*e* may be transmitted in a different order than the order shown, or the operations performed by base station 105-*e* and UE 115-*f* may be performed in different orders or at different times. Certain operations may also be left out of the process flow 700, or other operations may be added to the process flow 700. It is to be understood that while base station 105-*e* and UE 115-*f* are shown performing a number of the operations of process flow 700, any wireless device may perform the operations shown.

At 705, UE 115-*f* may identify a preemption configuration. In some examples, the preemption configuration may indicate in which operating state of a plurality of operating states the UE is to monitor for an ULPI. For example, the UE 115-*f* may identify that the preemption configuration indicates the UE 115-*f* is to monitor for ULPIs when the UE 115-*f* is operating in a connected operating state (e.g., an RRC_CONNECTED state). For example, in some cases, UE 115-*f* may monitor for ULPI when the UE 115-*f* is in a RRC_CONNECTED state (e.g., and UE 115-*f* may not monitor for ULPI in an RRC_IDLE state or an RRC_INACTIVE state). That is, in some cases, ULPI configuration may be conveyed via RRC configuration (e.g., but not by system information block (SIB) configuration). As such, an RRC connection between UE 115-*f* and base station 105-*e* may be established in order for the UE 115-*f* to monitor for the ULPI.

As discussed herein, the preemption configuration may further include or indicate instructions or rules for application of ULPIs for various random access scenarios. For example, a preemption configuration may configure the UE 115-*f* to disregard or ignore ULPI for certain random access messages (e.g., for random access messages of a CBRA procedure), a preemption configuration may configure the UE 115-*f* to disregard or ignore ULPI for certain random access message triggering events (e.g., for random access messages triggered by initial access attempts, etc. Further, a preemption configuration may configure the UE 115-*f* to apply or adhere to ULPI and preempt certain random access messages (e.g., random access messages of a CFRA procedure), a preemption configuration may configure the UE 115-*f* to apply or adhere to ULPI and preempt random access messages triggered by certain events (e.g., random access messages triggered by beam failure recovery), etc.

At 710, UE 115-*f* may monitor for the ULPI based on the UE operating in a connected operating state (e.g., in accordance with the preemption configuration), and the UE 115-*f* may receive an ULPI from base station 105-*e* (e.g., based on the monitoring). In some cases, the ULPI may indicate that at least a portion of a random access resource (e.g., a random access resource for a random access message the UE 115-*f* intends to transmit at 720) is being preempted.

At 715, UE 115-*f* may identify a rule for application of the ULPI based on the preemption configuration. In other words, the UE 115-*f* may identify the preemption configuration, and may identify whether to transmit a random access message via the random access resource or to preemption transmission of the random access message via the random access resource in accordance with the preemption configuration. In the example of process flow 700, at 720, UE 115-*f* may transmit the random access message in accordance with the preemption configuration.

For example, UE 115-*f* may identify that the preemption configuration indicates that uplink preemption does not apply to a CBRA procedure, and UE 115-*f* may transmit the random access message at 720 based on the random access message being part of a CBRA procedure.

In some examples, UE 115-*f* may identify that the preemption configuration indicates that uplink preemption does not apply to RACH transmissions in a PCell, and UE 115-*f* may transmit the random access message at 720 based on the random access message being part of a random access procedure for a PCell.

Additionally or alternatively, UE 115-*f* may identify that the preemption configuration indicates that uplink preemption does not apply to a random access procedure triggered by at least one of the following: initial access, handover, establishing a timing advance for addition of a secondary cell, uplink timing advance reestablishment, radio resource control connection re-establishment, or any combination thereof. At 715, UE 115-*f* may identify the random access message is part of a random access procedure triggered by initial access, handover, establishing a timing advance for addition of a secondary cell, uplink timing advance reestablishment, and/or radio resource control connection re-establishment, and the UE 115-*f* may transmit the random access message at 720 accordingly.

In some examples, a first SCS of a BWP of a serving cell on which the ULPI is transmitted may differ from a second SCS of the BWP of the serving cell for the random access resource. In some cases, transmission of the random access message at 720 may include transmitting the random access message during a first transmission time interval of the random access resource that does not overlap with a second transmission time interval that the ULPI indicates is preempted, the first transmission time interval having a longer duration than the second transmission time interval.

FIG. 7B illustrates an example process flow 701 for scenarios where a UE 115 preempts transmission of a random access message (e.g., where a UE 115 applies or adheres to an ULPI) in accordance with a preemption configuration. For example, process flow 701 may illustrate scenarios where ULPI indicates that at least a portion of a random access resource associated with a CFRA procedure is preempted, scenarios where ULPI indicates that at least a portion of a random access resource associated with a random access procedure triggered by beam failure recovery is preempted, etc.

In some examples, process flow 701 may implement aspects of wireless communications system 100 and/or wireless communications system 200. Further, process flow 701 may be implemented by a UE 115-*g* and a base station 105-*f*, which may be examples of a UE 115 and a base station 105 described with reference to FIGS. 1-6. In the following description of the process flow 701, the operations between UE 115-*g* and base station 105-*f* may be transmitted in a different order than the order shown, or the operations performed by base station 105-*f* and UE 115-*g* may be performed in different orders or at different times. Certain operations may also be left out of the process flow 701, or other operations may be added to the process flow 701. It is to be understood that while base station 105-*f* and UE 115-*g* are shown performing a number of the operations of process flow 701, any wireless device may perform the operations shown.

At 725, UE 115-*g* may identify a preemption configuration. In some examples, the preemption configuration may indicate in which operating state of a plurality of operating states the UE is to monitor for an ULPI. For example, the UE 115-*g* may identify that the preemption configuration indicates the UE 115-*g* is to monitor for ULPIs when the UE 115-*g* is operating in a connected operating state (e.g., an RRC_CONNECTED state). As discussed herein, the preemption configuration may further include or indicate instructions or rules for application of ULPIs for various random access scenarios. For example, a preemption configuration may configure the UE 115-*g* to disregard or ignore ULPI for certain random access messages (e.g., for random access messages of a CBRA procedure), a preemption configuration may configure the UE 115-*g* to disregard or ignore ULPI for certain random access message triggering events (e.g., for random access messages triggered by initial access attempts, etc. Further, a preemption configuration may configure the UE 115-*g* to apply or adhere to ULPI and preempt certain random access messages (e.g., random access messages of a CFRA procedure), a preemption configuration may configure the UE 115-*g* to apply or adhere to ULPI and preempt random access messages triggered by certain events (e.g., random access messages triggered by beam failure recovery), etc.

At 730, UE 115-*g* may monitor for the ULPI based on the UE operating in a connected operating state (e.g., in accordance with the preemption configuration), and the UE 115-*g* may receive an ULPI from base station 105-*f* (e.g., based on the monitoring). In some cases, the ULPI may indicate that at least a portion of a random access resource (e.g., a random access resource for a random access message the UE 115-*g* intends to transmit at 740) is being preempted.

At 735, UE 115-*g* may identify a rule for application of the ULPI based on the preemption configuration. In other words, the UE 115-*g* may identify the preemption configuration, and may identify whether to transmit a random access message via the random access resource or to preemption transmission of the random access message via the random access resource in accordance with the preemption configuration. In the example of process flow 700, at 740, UE 115-*g* may preempt transmission of the random access message in accordance with the preemption configuration. In some cases, as discussed herein, the entirety of the random access message may be preempted at 740 (e.g., as the ULPI indicates at least a portion of the random access resource is being preempted, the entire random access message may be preempted, in accordance with the preemption configuration).

For example, UE 115-*g* may identify that the preemption configuration indicates that uplink preemption applies to a CFRA procedure, and UE 115-*g* may preempt transmission of the random access message at 720 based on the random access message being part of a CFRA procedure. For example, at 740, in accordance with the preemption configuration, UE 115-*g* may preempt transmission of a random access preamble message and/or a random access payload message associated with a CFRA procedure.

In some examples, UE 115-*g* may identify that the preemption configuration indicates that uplink preemption does apply to RACH transmissions in a SCell, and UE 115-*f* may preempt transmission of the random access message at 740 based on the random access message being part of a random access procedure for a SCell.

Additionally or alternatively, UE 115-*g* may identify that the preemption configuration indicates that uplink preemption applies to a random access procedure triggered by at least one of the following: a downlink control channel order, beam failure recovery, a system information request, an uplink resource request, a scheduling request failure, or any combination thereof. At 735, the UE 115-*g* may identify that the random access message is part of a random access procedure triggered by a downlink control channel order, beam failure recovery, a system information request, an uplink resource request, and/or a scheduling request failure, and the UE 115-*g* may preempt the random access message at 740 accordingly.

In some cases, preemption of the random access message at 740 may include preempting transmission of the random access message based on dropping the random access message on a transmission time interval by transmission time interval basis, where the random access message spans more than one transmission time interval.

In some cases, when the UE 115-*g* preempts transmission of the random access message at 740, the UE 115-*g* may not increase a transmission power level, may not increment a power ramping counter (preamble_power_ramping_counter), may not increment a transmission counter (preamble_transmission_counter), or any combination thereof. In some cases, after preempting transmission of the random access message at 740, the UE 115-*g* may transmit the random access message in a next available random access resource subsequent to preempting transmission of the random access message via the random access resource.

In some examples, a first SCS of a BWP of a serving cell on which the ULPI is transmitted may differ from a second SCS of the BWP of the serving cell for the random access resource. In some cases, preemption of the random access message at 740 may include preempting transmission of the random access message during a first transmission time interval of the random access resource that overlaps with a second transmission time interval that the ULPI indicates is preempted, the first transmission time interval having a longer duration than the second transmission time interval (e.g., as discussed in more detail herein, for example, with reference to FIG. 6).

Figure 8:
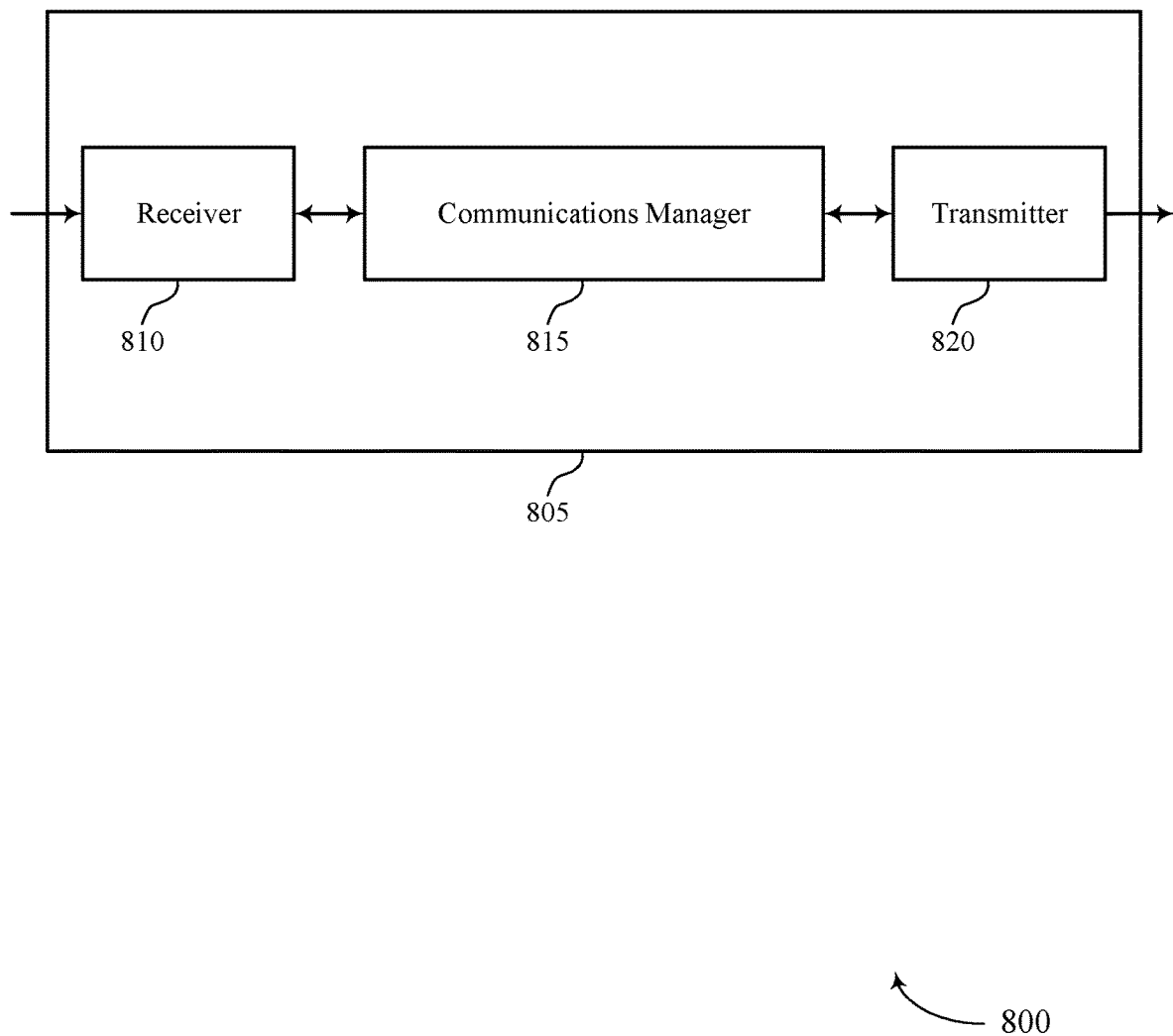
FIGS. 8 and 9 show block diagrams of devices that support application of uplink preemption to random access transmission in accordance with aspects of the present disclosure.

FIG. 8 shows a block diagram 800 of a device 805 that supports application of uplink preemption to random access transmission in accordance with aspects of the present disclosure. The device 805 may be an example of aspects of a UE 115 as described herein. The device 805 may include a receiver 810, a communications manager 815, and a transmitter 820. The device 805 may also include one or more processors, memory coupled with the one or more processors, and instructions stored in the memory that are executable by the one or more processors to enable the one or more processors to perform the features discussed herein. Each of these components may be in communication with one another (e.g., via one or more buses). Wireless device 805 may also include one or more processors, memory coupled with the one or more processors, and instructions stored in the memory that are executable by the one or more processors to enable the one or more processors to perform the roaming features discussed herein. Each of these components may be in communication with each other.

The receiver 810 may receive information such as packets, user data, or control information associated with various information channels (e.g., control channels, data channels, and information related to application of uplink preemption to random access transmission, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a preemption configuration that indicates in which operating state of a set of operating states the UE is to monitor for an uplink preemption indication. The communications manager 815 may transmit or preempt transmission of a random access message via a random access resource based on the preemption configuration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In some cases, the chain configuration manager 815 may be a processor. The processor may be coupled with memory and execute instructions stored in the memory that enable the processor to perform or facilitate the communication pattern detection and mitigation features discussed herein.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 815 as described herein may be implemented to realize one or more potential advantages. One implementation may allow for more efficient resource utilization and resource reallocation within a wireless communications system supporting various service deployments based on different preemption configurations. Another implementation may provide improved quality and reliability of service at the UE 115, as the number of separate resources allocated to the UE 115 may be reduced.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
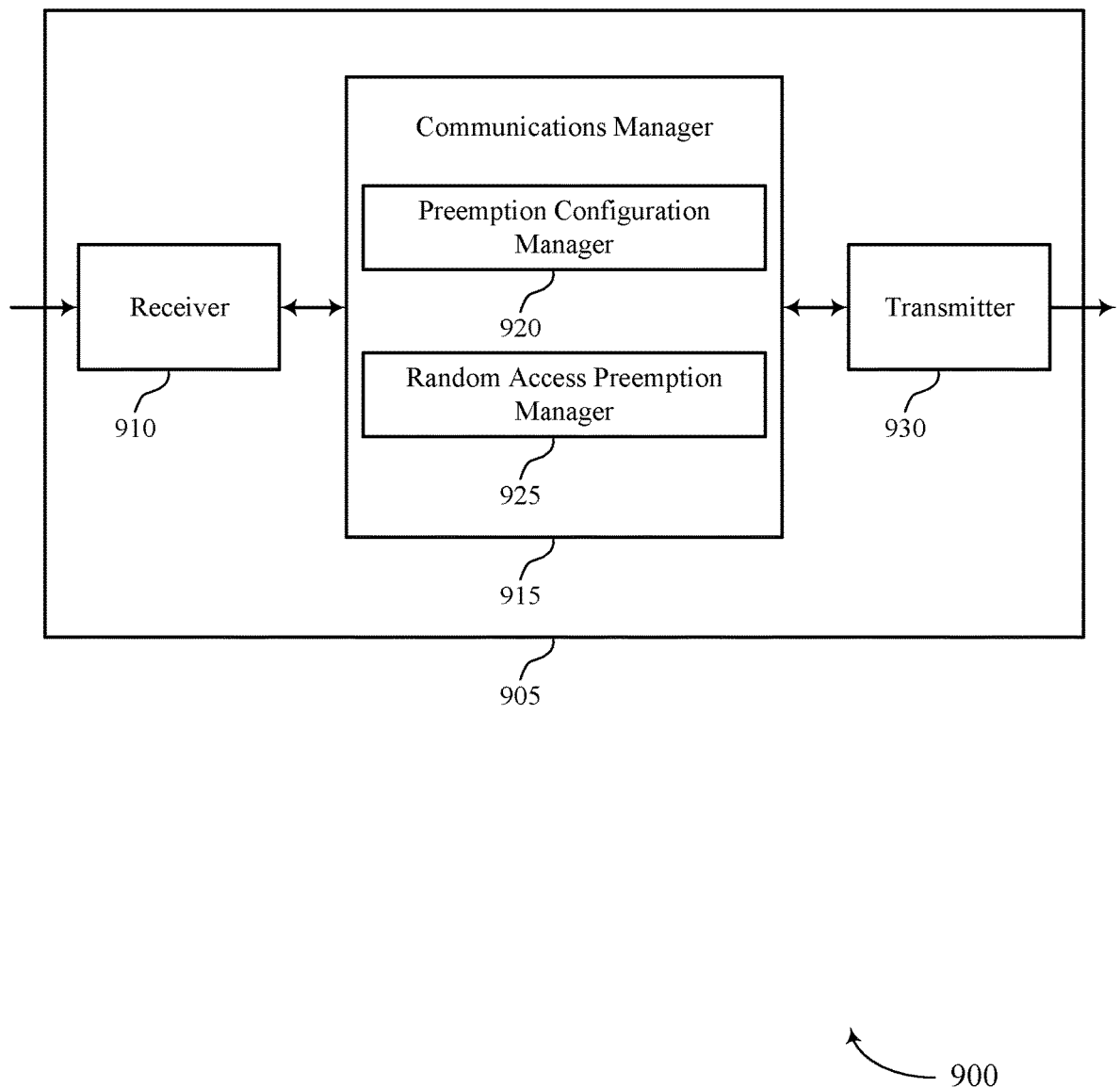

FIG. 9 shows a block diagram 900 of a device 905 that supports application of uplink preemption to random access transmission in accordance with aspects of the present disclosure. The device 905 may be an example of aspects of a device 805, or a UE 115 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to application of uplink preemption to random access transmission, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a preemption configuration manager 920 and a random access preemption manager 925. The communications manager 915 may be an example of aspects of the communications manager 1110 described herein.

The preemption configuration manager 920 may identify a preemption configuration that indicates in which operating state of a set of operating states the UE is to monitor for an uplink preemption indication. The random access preemption manager 925 may transmit or preempt transmission of a random access message via a random access resource based on the preemption configuration.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

In some cases, the preemption configuration manager and the random access preemption manager may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the preemption configuration manager and the random access preemption manager discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 10:
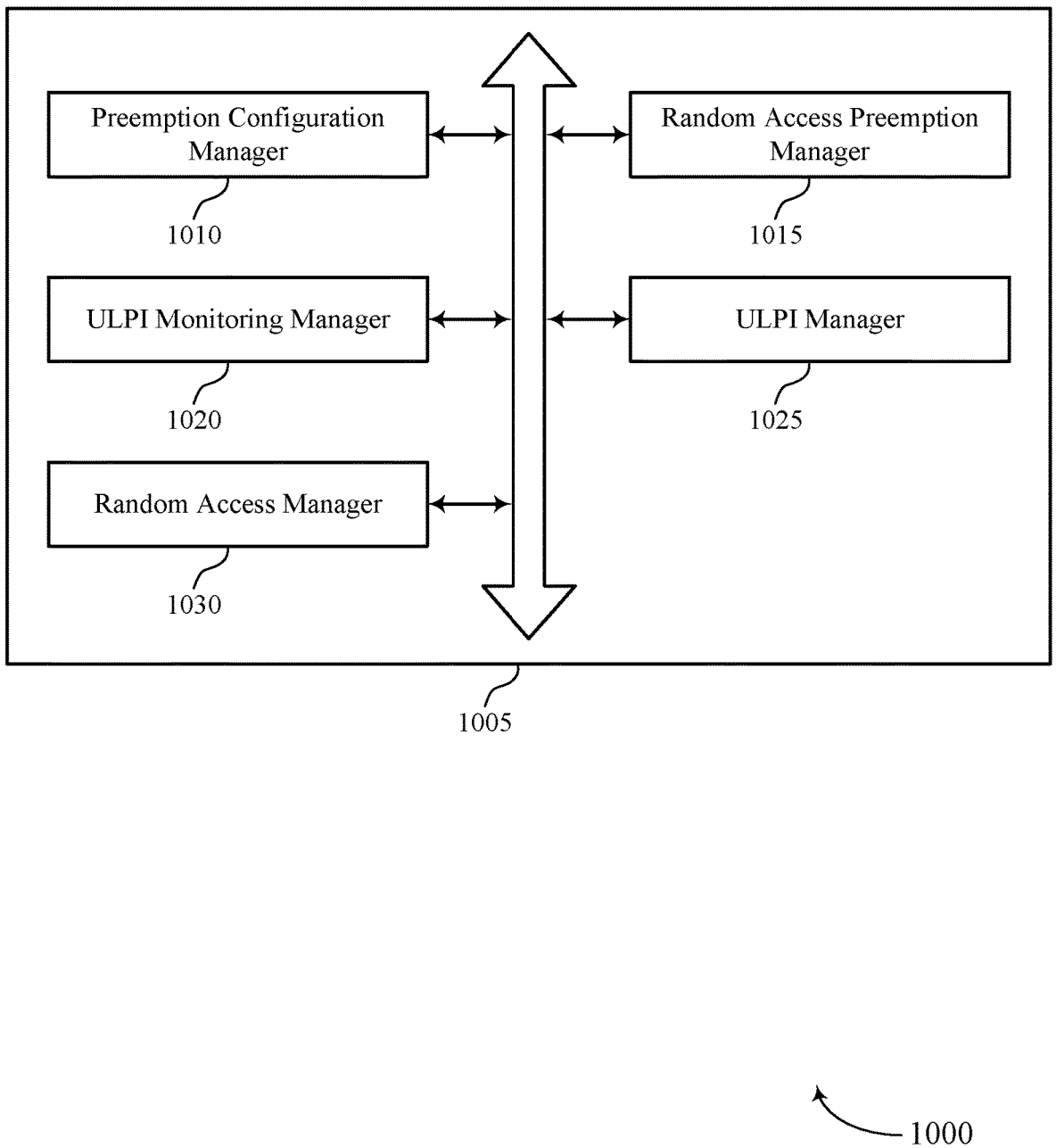
FIG. 10 shows a block diagram of a communications manager that supports application of uplink preemption to random access transmission in accordance with aspects of the present disclosure.

FIG. 10 shows a block diagram 1000 of a communications manager 1005 that supports application of uplink preemption to random access transmission in accordance with aspects of the present disclosure. The communications manager 1005 may be an example of aspects of a communications manager 815, a communications manager 915, or a communications manager 1110 described herein. The communications manager 1005 may include a preemption configuration manager 1010, a random access preemption manager 1015, an ULPI monitoring manager 1020, an ULPI manager 1025, and a random access manager 1030. Each of these modules may communicate, directly or indirectly, with one another (e.g., via one or more buses).

The preemption configuration manager 1010 may identify a preemption configuration that indicates in which operating state of a set of operating states the UE is to monitor for an uplink preemption indication. In some examples, the preemption configuration manager 1010 may identify that the preemption configuration indicates to monitor for the uplink preemption indication when the UE is operating in a connected operating state of the set of operating states. In some examples, the preemption configuration manager 1010 may identify that the preemption configuration indicates that uplink preemption does not apply to a contention-based random access procedure. In some examples, the preemption configuration manager 1010 may identify that the preemption configuration indicates that uplink preemption applies to a contention free random access procedure.

In some examples, the preemption configuration manager 1010 may identify that the preemption configuration indicates that uplink preemption applies to a random access procedure triggered by at least one of the following: a downlink control channel order, beam failure recovery, a system information request, an uplink resource request, a scheduling request failure, or any combination thereof. In some examples, the preemption configuration manager 1010 may identify that the preemption configuration indicates that uplink preemption does not apply to a random access procedure triggered by at least one of the following: initial access, handover, establishing a timing advance for addition of a secondary cell, uplink timing advance reestablishment, radio resource control connection re-establishment, or any combination thereof.

In some examples, the preemption configuration manager 1010 may identify that the preemption configuration indicates that uplink preemption applies to a random access procedure in a secondary cell. In some examples, the preemption configuration manager 1010 may identify that the preemption configuration indicates that uplink preemption does not apply to a random access procedure in a primary cell.

In some cases, the preemption configuration manager 1010 may be a processor (e.g., a transceiver processor, or a radio processor, or a receiver processor). The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio or an LTE radio or a Wi-Fi radio) of the device. A receiver processor may be collocated with and/or communicate with (e.g., direct the operations of) a receiver of the device.

The random access preemption manager 1015 may transmit or preempt transmission of a random access message via a random access resource based on the preemption configuration. In some examples, the random access preemption manager 1015 may transmit the random access message in accordance with the contention-based random access procedure. In some examples, the random access preemption manager 1015 may preempt transmission of the random access message in accordance with the contention free random access procedure. In some examples, the random access preemption manager 1015 may preempt transmission of a random access preamble message. In some examples, the random access preemption manager 1015 may preempt transmission of a random access preamble message and a random access payload message.

In some cases, the random access preemption manager 1015 may be a processor (e.g., a transceiver processor, or a radio processor, or a receiver processor). The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio or an LTE radio or a Wi-Fi radio) of the device. A receiver processor may be collocated with and/or communicate with (e.g., direct the operations of) a receiver of the device.

In some examples, the random access preemption manager 1015 may preempt transmission of the random access message. In some examples, the random access preemption manager 1015 may transmission of an entirety of the random access message is preempted. In some examples, the random access preemption manager 1015 may preempt transmission of the random access message based on dropping the random access message on a transmission time interval by transmission time interval basis, where the random access message spans more than one transmission time interval. In some examples, the random access preemption manager 1015 may monitor for a second downlink control channel order subsequent to preempting transmission of the random access message. In some examples, the random access preemption manager 1015 may transmit the random access message.

In some examples, the random access preemption manager 1015 may preempt transmission of the random access message during a first transmission time interval of the random access resource that overlaps with a second transmission time interval that the uplink preemption indication indicates is preempted, the first transmission time interval having a longer duration than the second transmission time interval. In some examples, the random access preemption manager 1015 may transmit the random access message during a first transmission time interval of the random access resource that does not overlap with a second transmission time interval that the uplink preemption indication indicates is preempted, the first transmission time interval having a longer duration than the second transmission time interval. In some cases, a first subcarrier spacing of a bandwidth part of a serving cell on which the uplink preemption indication is transmitted differs from a second subcarrier spacing of the bandwidth part of the serving cell for the random access resource.

The ULPI monitoring manager 1020 may monitor for the uplink preemption indication based on the UE operating in a connected operating state of the set of operating states. In some examples, the ULPI monitoring manager 1020 may skip monitoring for the uplink preemption indication based on the UE operating in an idle operating state, an inactive operating state, or both, of the set of operating states, where the random access message is transmitted via the random access resource based on the UE operating in the idle operating state, the inactive operating state, or both.

In some cases, the ULPI monitoring manager 1020 may be a processor (e.g., a transceiver processor, or a radio processor, or a receiver processor). The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio or an LTE radio or a Wi-Fi radio) of the device. A receiver processor may be collocated with and/or communicate with (e.g., direct the operations of) a receiver of the device.

The ULPI manager 1025 may receive, from a base station, the uplink preemption indication indicating that at least a portion of the random access resource is being preempted, where the random access message is transmitted or preempted from transmission via the random access resource based on the uplink preemption indication.

In some cases, the ULPI manager 1025 may be a processor (e.g., a transceiver processor, or a radio processor, or a receiver processor). The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio or an LTE radio or a Wi-Fi radio) of the device. A receiver processor may be collocated with and/or communicate with (e.g., direct the operations of) a receiver of the device.

The random access manager 1030 may transmit the random access message in a next available random access resource subsequent to preempting transmission of the random access message via the random access resource. In some examples, the random access manager 1030 may receive a first downlink control channel order that schedules transmission of the random access message. In some cases, the UE does not increase a transmission power level, increment a power ramping counter, increment a transmission counter, or any combination thereof, based on preempting transmission of the random access message.

In some cases, the random access manager 1030 may be a processor (e.g., a transceiver processor, or a radio processor, or a receiver processor). The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio or an LTE radio or a Wi-Fi radio) of the device. A receiver processor may be collocated with and/or communicate with (e.g., direct the operations of) a receiver of the device.

In some cases, the preemption configuration manager 1010, the random access preemption manager 1015, the ULPI monitoring manager 1020, the ULPI manager 1025, and the random access manager 1030 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the preemption configuration manager 1010, the random access preemption manager 1015, the ULPI monitoring manager 1020, the ULPI manager 1025, and the random access manager 1030 discussed herein.

Figure 11:
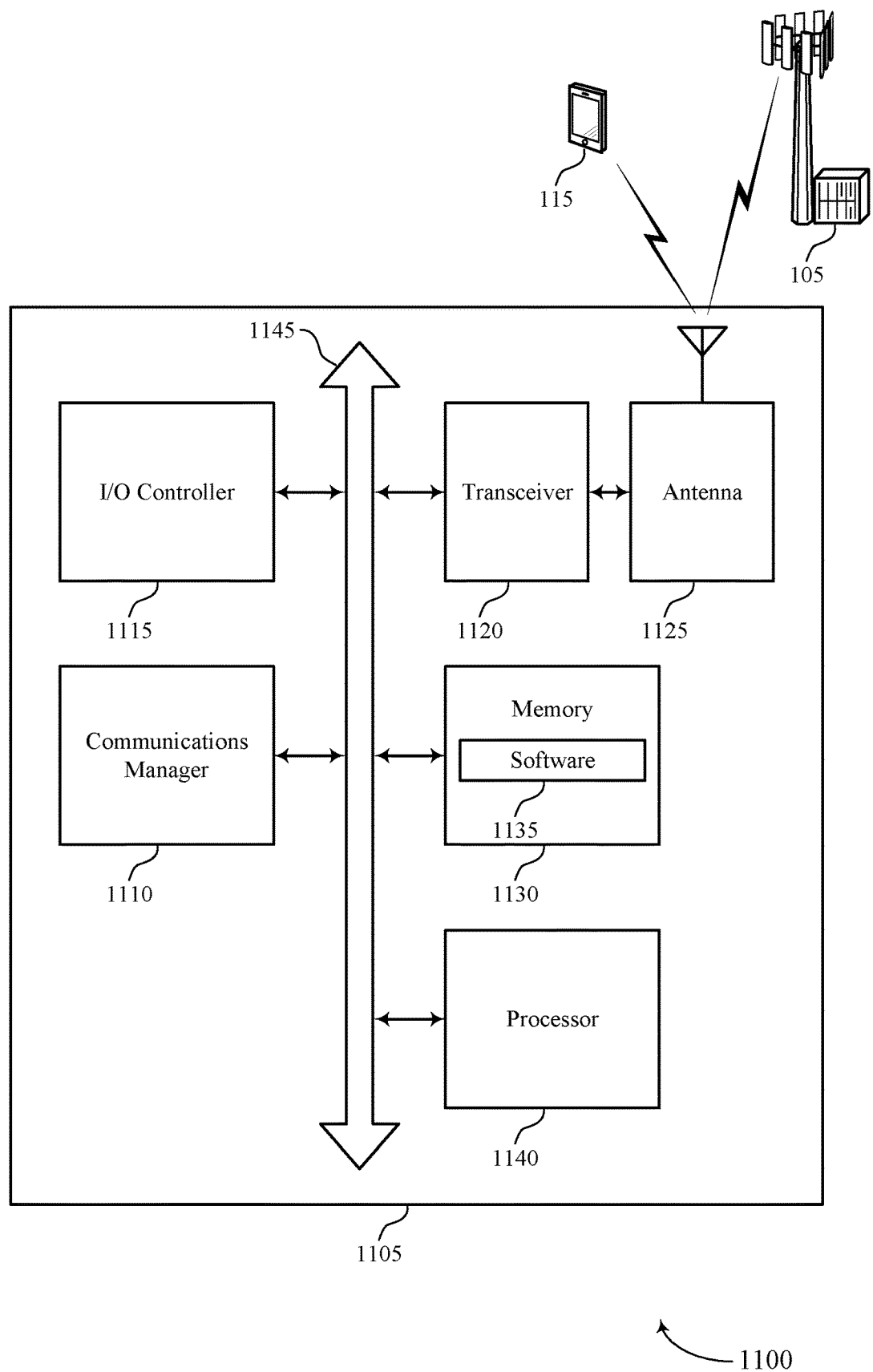
FIG. 11 shows a diagram of a system including a device that supports application of uplink preemption to random access transmission in accordance with aspects of the present disclosure.

FIG. 11 shows a diagram of a system 1100 including a device 1105 that supports application of uplink preemption to random access transmission in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a preemption configuration that indicates in which operating state of a set of operating states the UE is to monitor for an uplink preemption indication. The communications manager 1110 may transmit or preempt transmission of a random access message via a random access resource based on the preemption configuration.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code or software 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting application of uplink preemption to random access transmission).

Based on the utilization of different preemption configurations, a processor 1140 of a UE 115 may save power through more efficient resource utilization because the processor 1140 may be ready to respond more efficiently through the reduction of a ramp up in processing power.

The software 1135 may include instructions to implement aspects of the present disclosure, including instructions to support wireless communications. The software 1135 may be stored in a non-transitory computer-readable medium such as system memory or other type of memory. In some cases, the software 1135 may not be directly executable by the processor 1140 but may cause a computer (e.g., when compiled and executed) to perform functions described herein.

Figure 12:
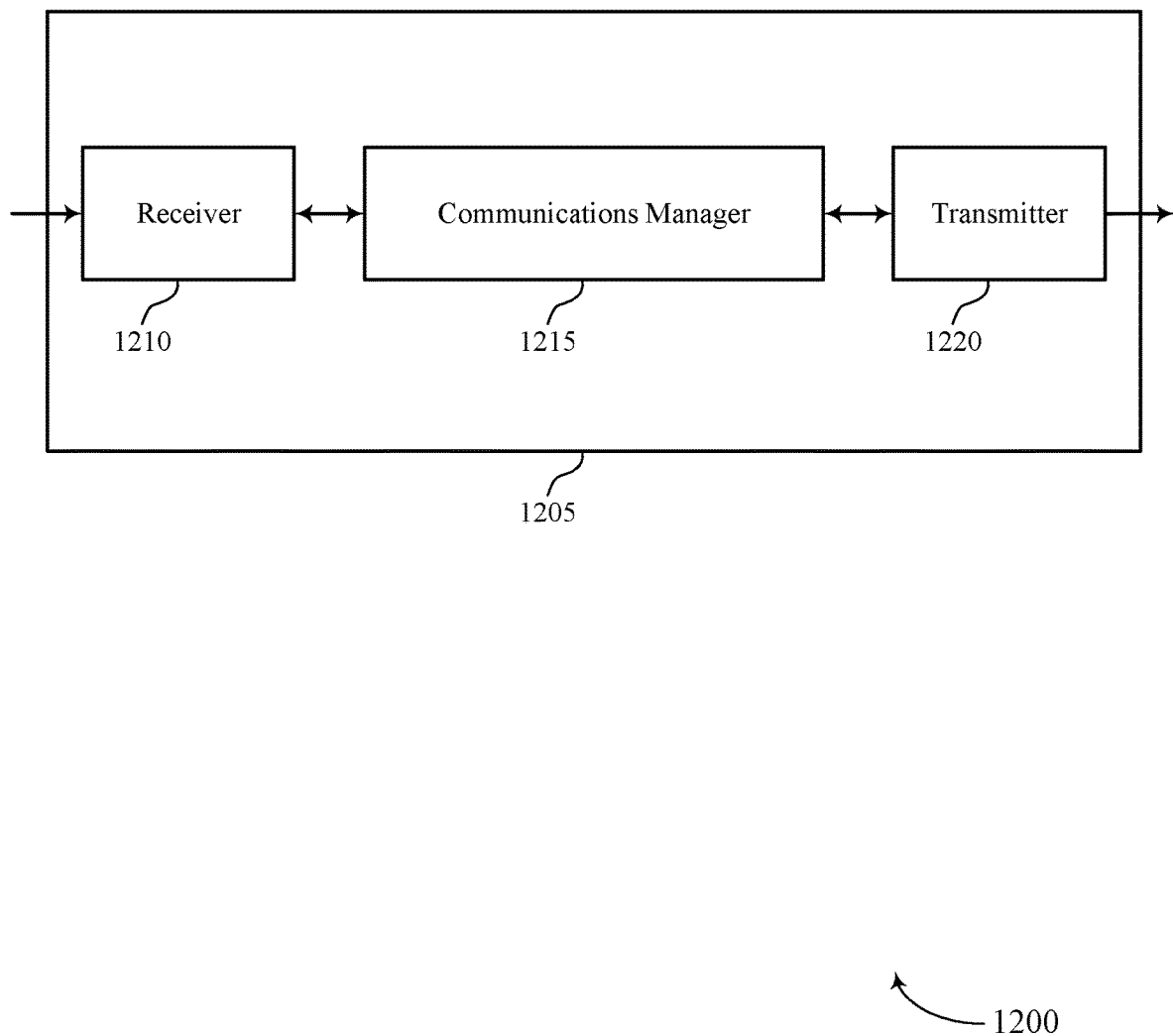
FIGS. 12 and 13 show block diagrams of devices that support application of uplink preemption to random access transmission in accordance with aspects of the present disclosure.

FIG. 12 shows a block diagram 1200 of a device 1205 that supports application of uplink preemption to random access transmission in accordance with aspects of the present disclosure. The device 1205 may be an example of aspects of a base station 105 as described herein. The device 1205 may include a receiver 1210, a communications manager 1215, and a transmitter 1220. The device 1205 may also include one or more processors, memory coupled with the one or more processors, and instructions stored in the memory that are executable by the one or more processors to enable the one or more processors to perform the [broad title feature] features discussed herein. Each of these components may be in communication with one another (e.g., via one or more buses).

The receiver 1210 may receive information such as packets, user data, or control information associated with various information channels (e.g., control channels, data channels, and information related to application of uplink preemption to random access transmission, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may establish connectivity with a UE in a connected state, transmit, to the UE, an uplink preemption indication indicating that at least a portion of a random access resource is being preempted based on the connected state, and schedule the random access resource based on the uplink preemption indication. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 1215 as described herein may be implemented to realize one or more potential advantages. One implementation may allow for more efficient resource utilization and resource reallocation within a wireless communications system supporting various service deployments based on different preemption configurations. Another implementation may provide improved quality and reliability of service at the base station 105, as the number of separate resources that need to be allocated may be reduced.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
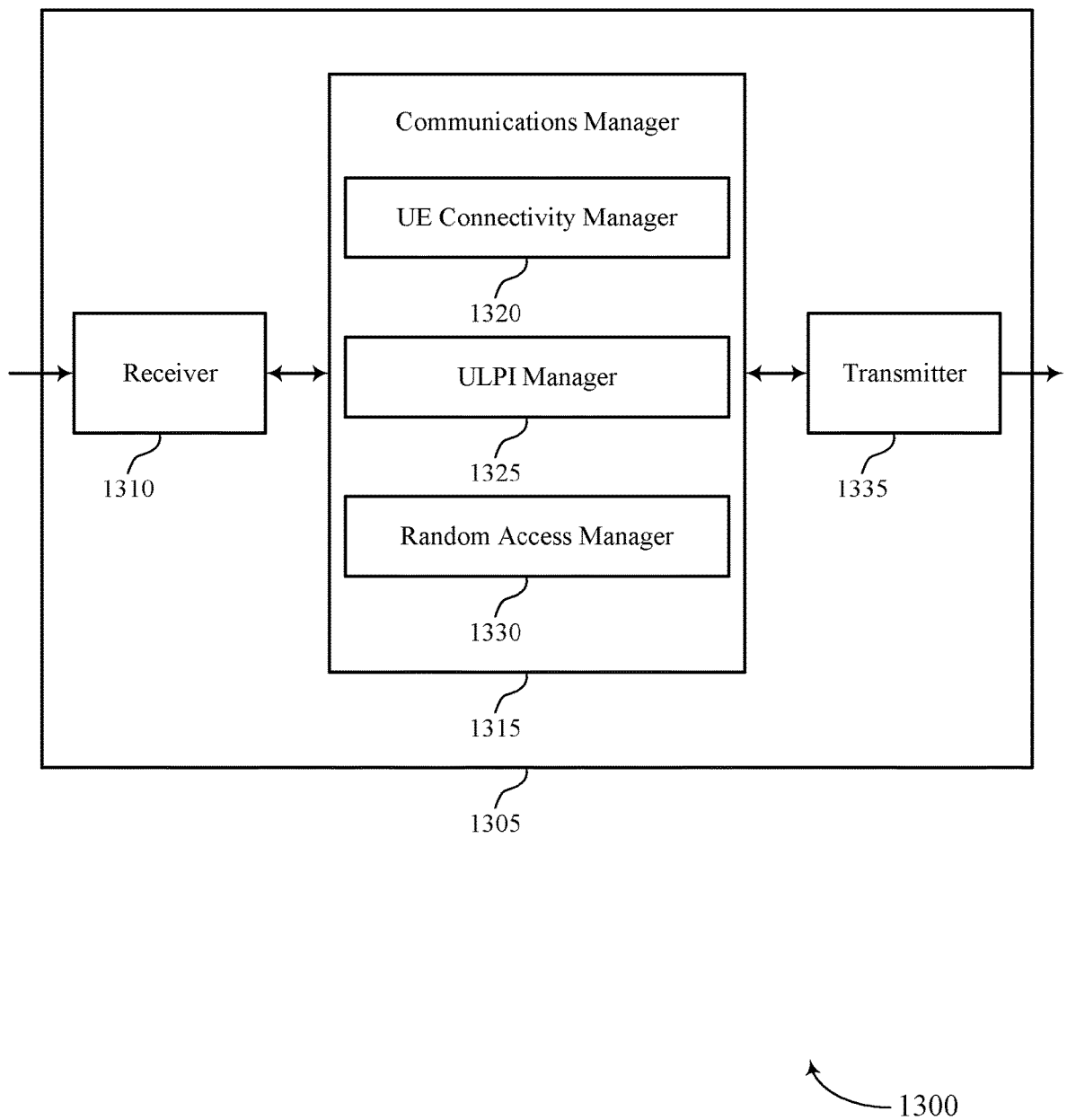

FIG. 13 shows a block diagram 1300 of a device 1305 that supports application of uplink preemption to random access transmission in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses). Wireless device 1305 may also include one or more processors, memory coupled with the one or more processors, and instructions stored in the memory that are executable by the one or more processors to enable the one or more processors to perform the roaming features discussed herein. Each of these components may be in communication with each other.

The receiver 1310 may receive information such as packets, user data, or control information associated with various information channels (e.g., control channels, data channels, and information related to application of uplink preemption to random access transmission, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include an UE connectivity manager 1320, an ULPI manager 1325, and a random access manager 1330. The communications manager 1315 may be an example of aspects of the communications manager 1510 described herein.

The UE connectivity manager 1320 may establish connectivity with a UE in a connected state. The ULPI manager 1325 may transmit, to the UE, an uplink preemption indication indicating that at least a portion of a random access resource is being preempted based on the connected state. The random access manager 1330 may schedule the random access resource based on the uplink preemption indication.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

In some cases, the UE connectivity manager 1320, the ULPI manager 1325, and the random access manager 1330 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the UE connectivity manager 1320, the ULPI manager 1325, and the random access manager 1330 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 14:
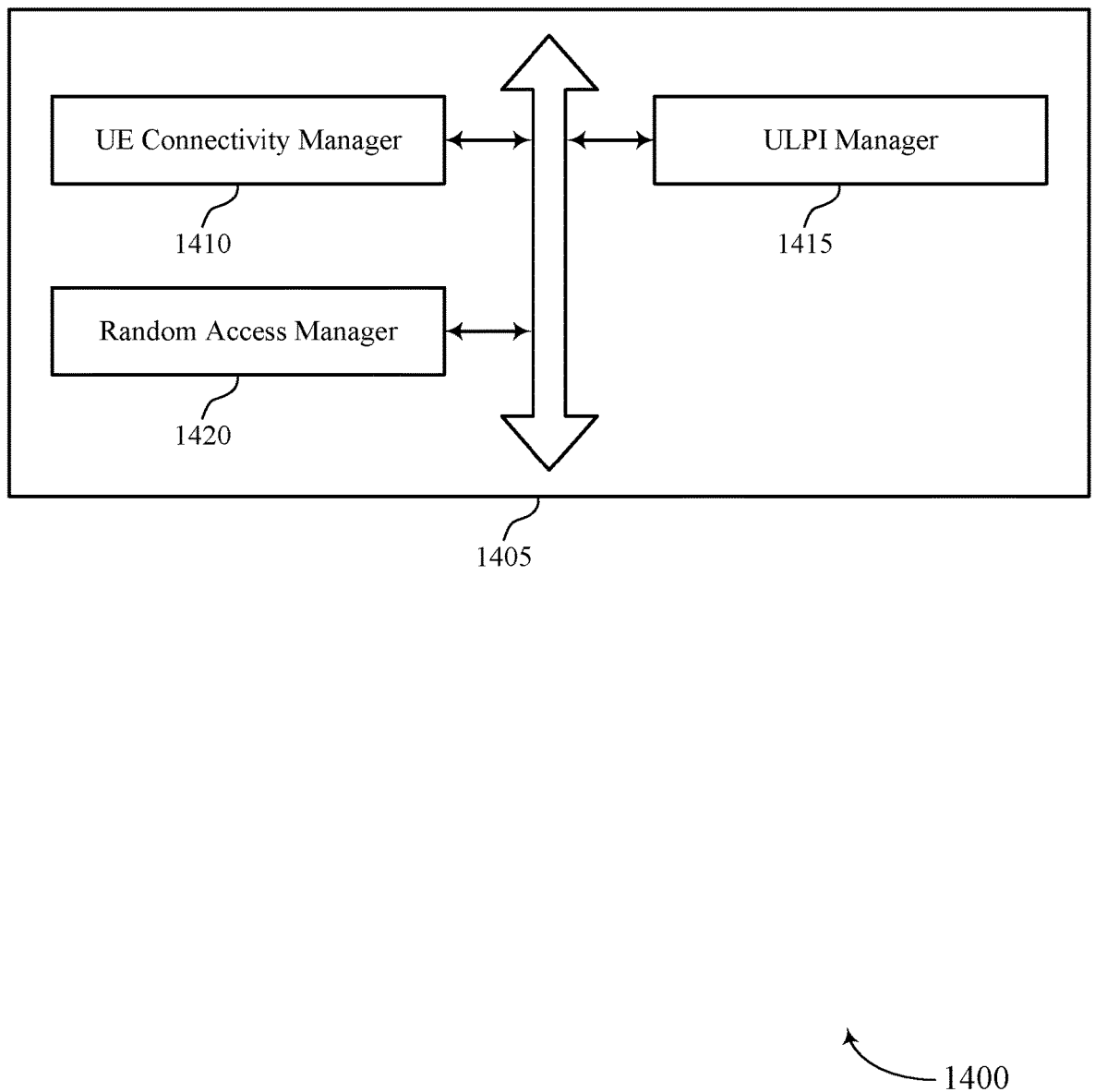
FIG. 14 shows a block diagram of a communications manager that supports application of uplink preemption to random access transmission in accordance with aspects of the present disclosure.

FIG. 14 shows a block diagram 1400 of a communications manager 1405 that supports application of uplink preemption to random access transmission in accordance with aspects of the present disclosure. The communications manager 1405 may be an example of aspects of a communications manager 1215, a communications manager 1315, or a communications manager 1510 described herein. The communications manager 1405 may include an UE connectivity manager 1410, an ULPI manager 1415, and a random access manager 1420. Each of these modules may communicate, directly or indirectly, with one another (e.g., via one or more buses).

The UE connectivity manager 1410 may establish connectivity with a UE in a connected state. The ULPI manager 1415 may transmit, to the UE, an uplink preemption indication indicating that at least a portion of a random access resource is being preempted based on the connected state.

In some cases, the UE connectivity manager 1410 may be a processor (e.g., a transceiver processor, or a radio processor, or a receiver processor). The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio or an LTE radio or a Wi-Fi radio) of the device. A receiver processor may be collocated with and/or communicate with (e.g., direct the operations of) a receiver of the device.

The random access manager 1420 may schedule the random access resource based on the uplink preemption indication. In some examples, the random access manager 1420 may receive, from the UE, a random access message in a next available random access resource subsequent to preempting transmission of the random access message via the random access resource. In some examples, the random access manager 1420 may transmit a first control channel order that schedules transmission of a random access message. In some examples, the random access manager 1420 may transmit a second control channel order subsequent to preempting transmission of the random access message. In some cases, a first subcarrier spacing of a bandwidth part of a serving cell on which the uplink preemption indication is transmitted differs from a second subcarrier spacing of the bandwidth part of the serving cell for the random access resource.

In some cases, the random access manager 1420 may be a processor (e.g., a transceiver processor, or a radio processor, or a receiver processor). The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio or an LTE radio or a Wi-Fi radio) of the device. A receiver processor may be collocated with and/or communicate with (e.g., direct the operations of) a receiver of the device.

In some cases, the UE connectivity manager 1410, the ULPI manager 1415, and the random access manager 1420 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the UE connectivity manager 1410, the ULPI manager 1415, and the random access manager 1420 discussed herein.

Figure 15:
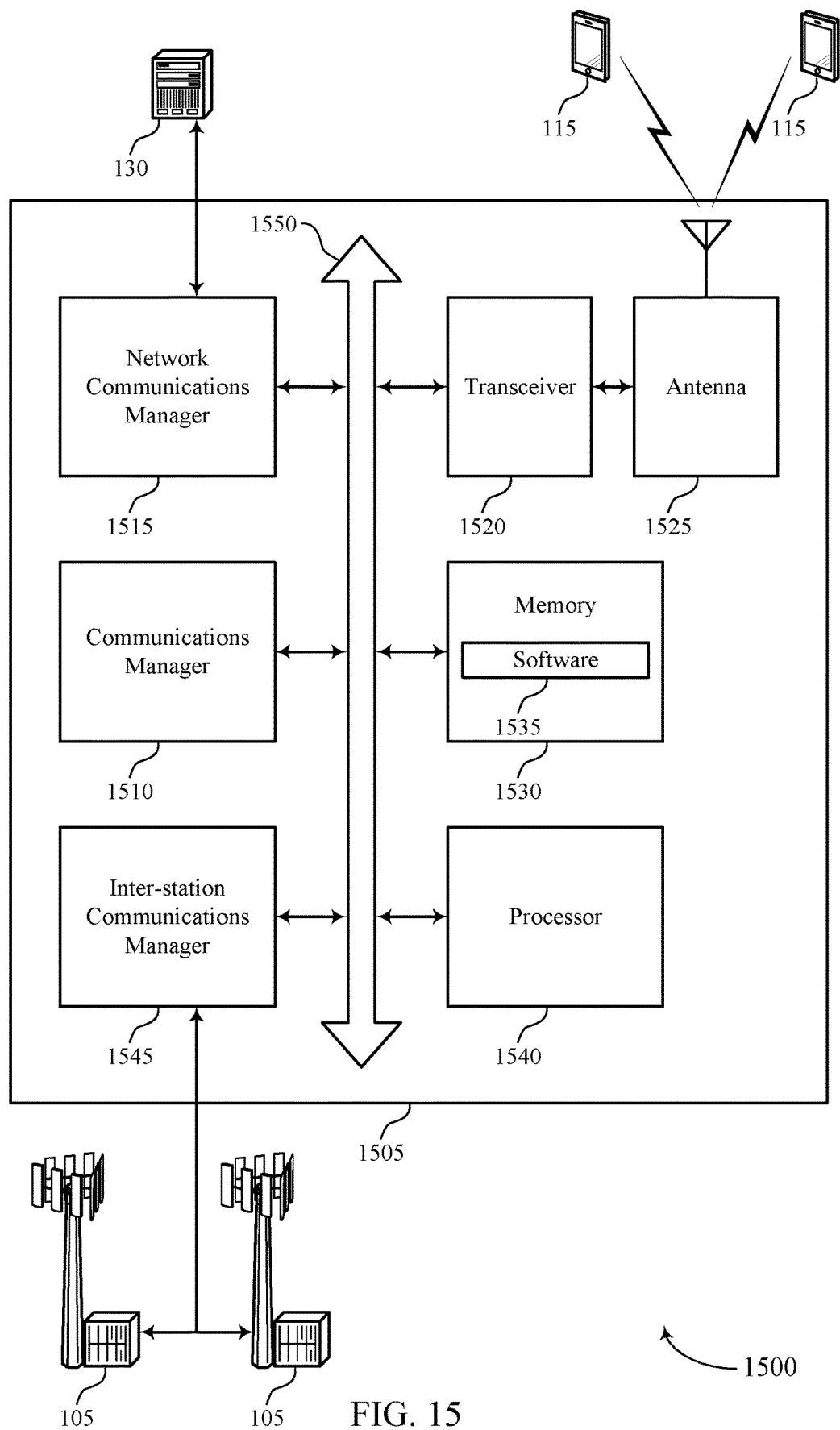
FIG. 15 shows a diagram of a system including a device that supports application of uplink preemption to random access transmission in accordance with aspects of the present disclosure.

FIG. 15 shows a diagram of a system 1500 including a device 1505 that supports application of uplink preemption to random access transmission in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may establish connectivity with a UE in a connected state, transmit, to the UE, an uplink preemption indication indicating that at least a portion of a random access resource is being preempted based on the connected state, and schedule the random access resource based on the uplink preemption indication.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code or software 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting application of uplink preemption to random access transmission).

Based on the utilization of different preemption configurations, a processor 1540 of a base station 105 may save power through more efficient resource utilization because the processor 1540 may be ready to respond more efficiently through the reduction of a ramp up in processing power.

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The software 1535 may include instructions to implement aspects of the present disclosure, including instructions to support wireless communications. The software 1535 may be stored in a non-transitory computer-readable medium such as system memory or other type of memory. In some cases, the software 1535 may not be directly executable by the processor 1540 but may cause a computer (e.g., when compiled and executed) to perform functions described herein.

Figure 16:
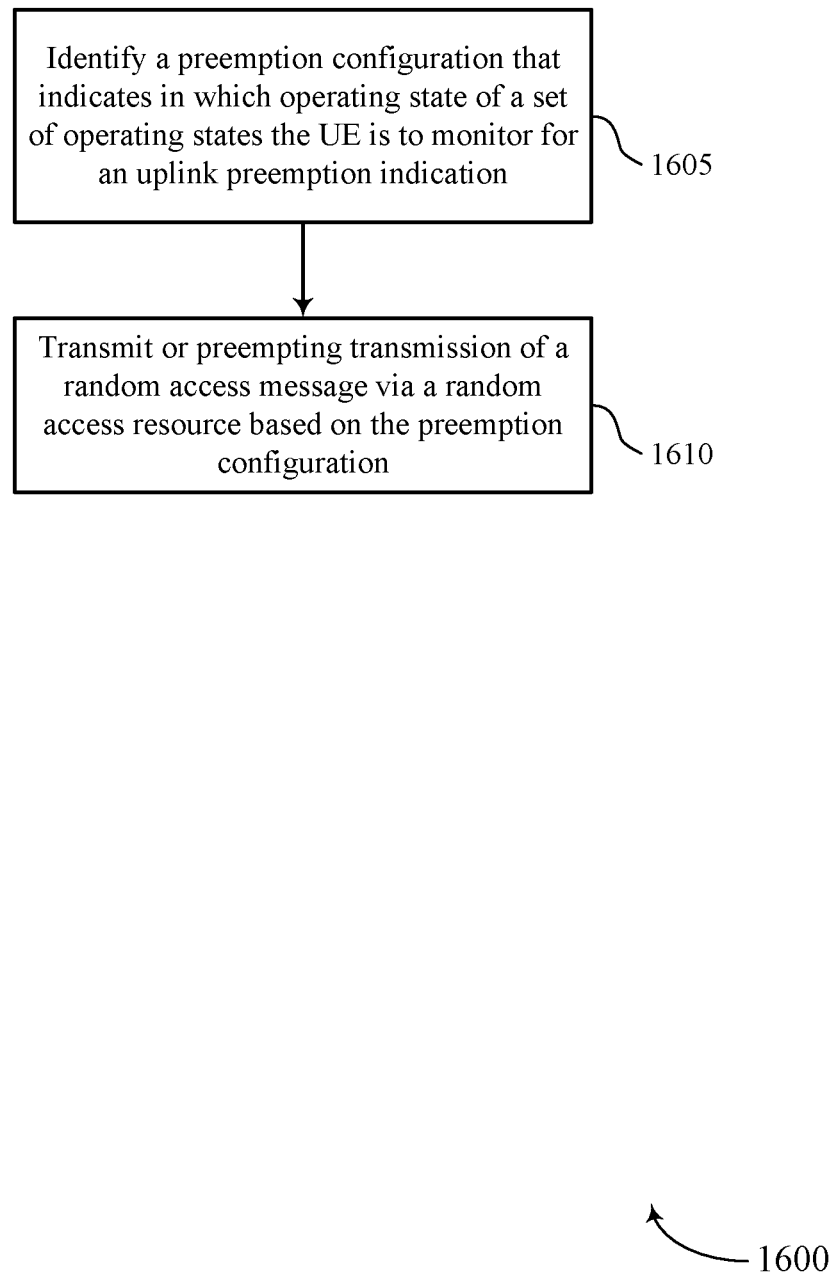
FIGS. 16 through 19 show flowcharts illustrating methods that support application of uplink preemption to random access transmission in accordance with aspects of the present disclosure.

FIG. 16 shows a flowchart illustrating a method 1600 that supports application of uplink preemption to random access transmission in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may identify a preemption configuration that indicates in which operating state of a set of operating states the UE is to monitor for an uplink preemption indication. The operations of 1605 may be performed according to the methods described herein. In some examples, aspects of the operations of 1605 may be performed by a preemption configuration manager as described with reference to FIGS. 8 through 11.

At 1610, the UE may transmit or preempt transmission of a random access message via a random access resource based on the preemption configuration. The operations of 1610 may be performed according to the methods described herein. In some examples, aspects of the operations of 1610 may be performed by a random access preemption manager as described with reference to FIGS. 8 through 11.

Figure 17:
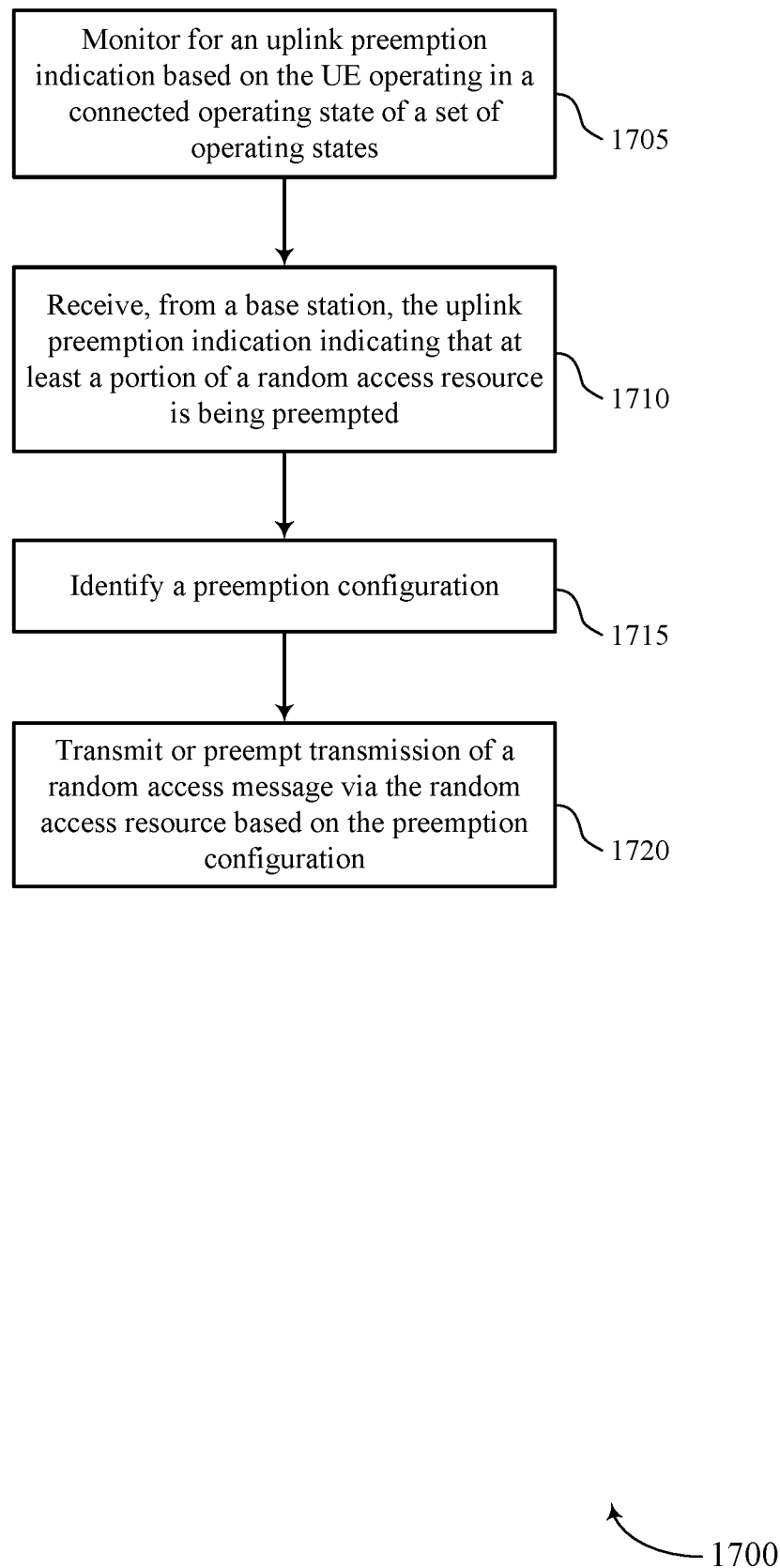

FIG. 17 shows a flowchart illustrating a method 1700 that supports application of uplink preemption to random access transmission in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may monitor for an uplink preemption indication based on the UE operating in a connected operating state of a set of operating states. The operations of 1705 may be performed according to the methods described herein. In some examples, aspects of the operations of 1705 may be performed by an ULPI monitoring manager as described with reference to FIGS. 8 through 11.

At 1710, the UE may receive, from a base station, the uplink preemption indication indicating that at least a portion of a random access resource is being preempted. The operations of 1710 may be performed according to the methods described herein. In some examples, aspects of the operations of 1710 may be performed by an ULPI manager as described with reference to FIGS. 8 through 11.

At 1715, the UE may identify a preemption configuration. The operations of 1715 may be performed according to the methods described herein. In some examples, aspects of the operations of 1715 may be performed by a preemption configuration manager as described with reference to FIGS. 8 through 11.

At 1720, the UE may transmit or preempt transmission of a random access message via the random access resource based on the preemption configuration. The operations of 1720 may be performed according to the methods described herein. In some examples, aspects of the operations of 1720 may be performed by a random access preemption manager as described with reference to FIGS. 8 through 11.

Figure 18:
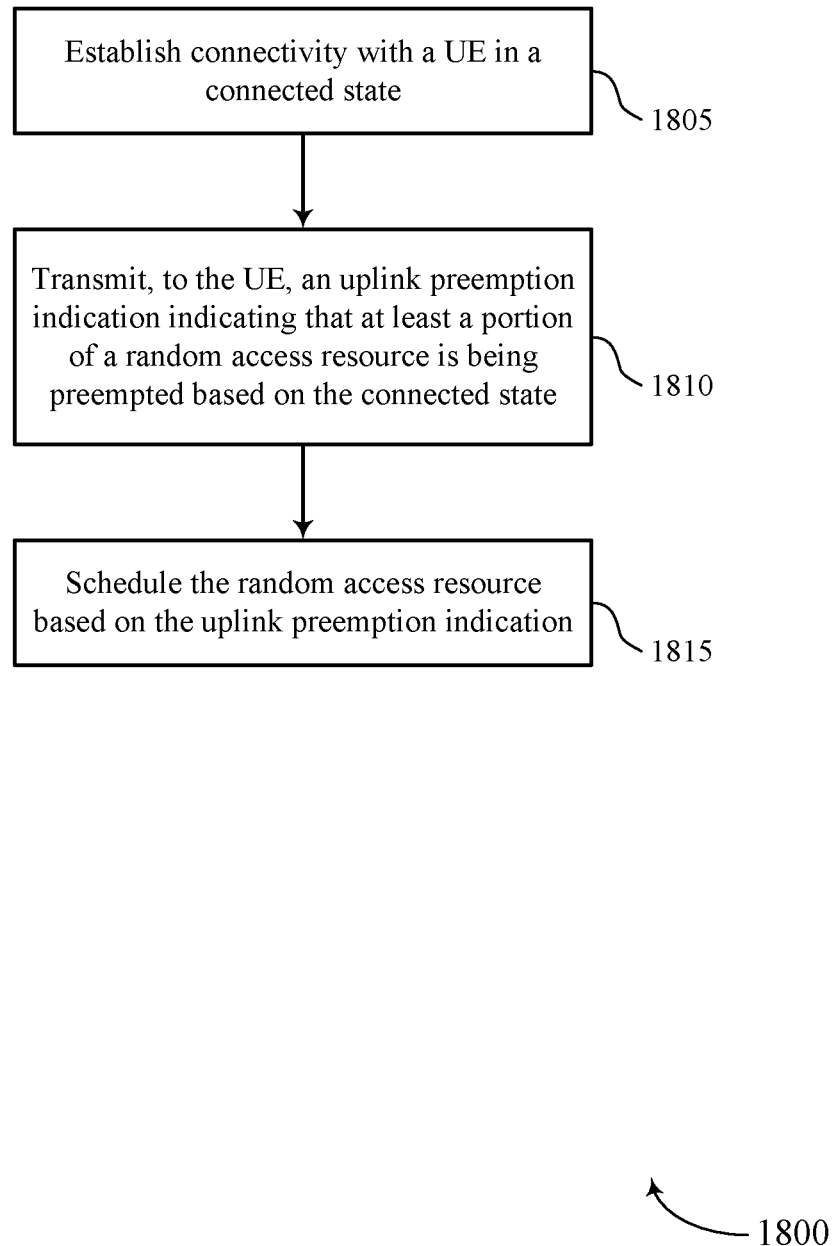

FIG. 18 shows a flowchart illustrating a method 1800 that supports application of uplink preemption to random access transmission in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, the base station may establish connectivity with a UE in a connected state. The operations of 1805 may be performed according to the methods described herein. In some examples, aspects of the operations of 1805 may be performed by an UE connectivity manager as described with reference to FIGS. 12 through 15.

At 1810, the base station may transmit, to the UE, an uplink preemption indication indicating that at least a portion of a random access resource is being preempted based on the connected state. The operations of 1810 may be performed according to the methods described herein. In some examples, aspects of the operations of 1810 may be performed by an ULPI manager as described with reference to FIGS. 12 through 15.

At 1815, the base station may schedule the random access resource based on the uplink preemption indication. The operations of 1815 may be performed according to the methods described herein. In some examples, aspects of the operations of 1815 may be performed by a random access manager as described with reference to FIGS. 12 through 15.

Figure 19:
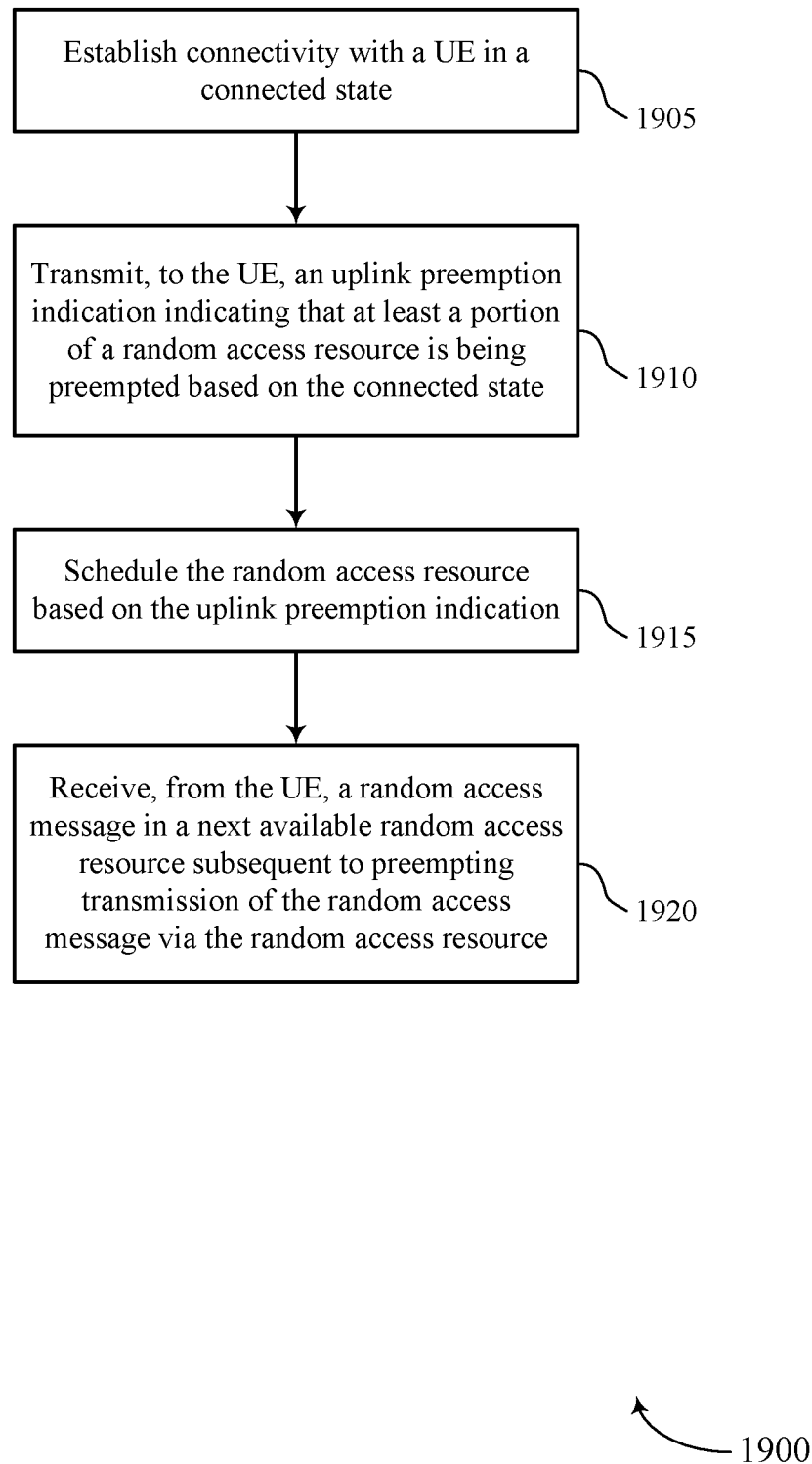

FIG. 19 shows a flowchart illustrating a method 1900 that supports application of uplink preemption to random access transmission in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may establish connectivity with a UE in a connected state. The operations of 1905 may be performed according to the methods described herein.

In some examples, aspects of the operations of 1905 may be performed by an UE connectivity manager as described with reference to FIGS. 12 through 15.

At 1910, the base station may transmit, to the UE, an uplink preemption indication indicating that at least a portion of a random access resource is being preempted based on the connected state. The operations of 1910 may be performed according to the methods described herein. In some examples, aspects of the operations of 1910 may be performed by an ULPI manager as described with reference to FIGS. 12 through 15.

At 1915, the base station may schedule the random access resource based on the uplink preemption indication. The operations of 1915 may be performed according to the methods described herein. In some examples, aspects of the operations of 1915 may be performed by a random access manager as described with reference to FIGS. 12 through 15.

At 1920, the base station may receive, from the UE, a random access message in a next available random access resource subsequent to preempting transmission of the random access message via the random access resource. The operations of 1920 may be performed according to the methods described herein. In some examples, aspects of the operations of 1920 may be performed by a random access manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    identifying a preemption configuration that indicates in which operating state of a plurality of operating states the UE is to monitor for an uplink preemption indication; and
    transmitting or preempting transmission of a random access message via a random access resource based at least in part on the preemption configuration.

2. The method of claim 1, wherein identifying the preemption configuration comprises:
    identifying that the preemption configuration indicates to monitor for the uplink preemption indication when the UE is operating in a connected operating state of the plurality of operating states.

3. The method of claim 1, further comprising:
    monitoring for the uplink preemption indication based at least in part on the UE operating in a connected operating state of the plurality of operating states.

4. The method of claim 3, further comprising:
    receiving, from a base station, the uplink preemption indication indicating that at least a portion of the random access resource is being preempted, wherein the random access message is transmitted or preempted from transmission via the random access resource based at least in part on the uplink preemption indication.

5. The method of claim 1, further comprising:
skipping monitoring for the uplink preemption indication based at least in part on the UE operating in an idle operating state, an inactive operating state, or both, of the plurality of operating states, wherein the random access message is transmitted via the random access resource based at least in part on the UE operating in the idle operating state, the inactive operating state, or both.

6. The method of claim 1, wherein identifying the preemption configuration comprises:
identifying that the preemption configuration indicates that uplink preemption does not apply to a contention-based random access procedure.

7. The method of claim 6, wherein transmitting or preempting transmission of the random access message comprises:
transmitting the random access message in accordance with the contention-based random access procedure.

8. The method of claim 1, wherein identifying the preemption configuration comprises:
identifying that the preemption configuration indicates that uplink preemption applies to a contention free random access procedure.

9. The method of claim 8, wherein transmitting or preempting transmission of the random access message comprises:
preempting transmission of the random access message in accordance with the contention free random access procedure.

10. The method of claim 9, wherein preempting transmission of the random access message comprises:
preempting transmission of a random access preamble message.

11. The method of claim 9, wherein preempting transmission of the random access message comprises:
preempting transmission of a random access preamble message and a random access payload message.

12. The method of claim 1, wherein identifying the preemption configuration comprises:
identifying that the preemption configuration indicates that uplink preemption applies to a random access procedure triggered by at least one of the following: a downlink control channel order, beam failure recovery, a system information request, an uplink resource request, a scheduling request failure, or any combination thereof.

13. The method of claim 1, wherein identifying the preemption configuration comprises:
identifying that the preemption configuration indicates that uplink preemption does not apply to a random access procedure triggered by at least one of the following: initial access, handover, establishing a timing advance for addition of a secondary cell, uplink timing advance reestablishment, radio resource control connection re-establishment, or any combination thereof.

14. The method of claim 1, wherein transmitting or preempting transmission of the random access message comprises:
preempting transmission of the random access message.

15. The method of claim 14, wherein:
transmission of an entirety of the random access message is preempted.

16. The method of claim 14, wherein preempting transmission of the random access message comprises:
preempting transmission of the random access message based at least in part on dropping the random access message on a transmission time interval by transmission time interval basis, wherein the random access message spans more than one transmission time interval.

17. The method of claim 14, wherein the UE does not increase a transmission power level, increment a power ramping counter, increment a transmission counter, or any combination thereof, based at least in part on preempting transmission of the random access message.

18. The method of claim 14, further comprising:
transmitting the random access message in a next available random access resource subsequent to preempting transmission of the random access message via the random access resource.

19. The method of claim 14, further comprising:
receiving a first downlink control channel order that schedules transmission of the random access message; and
monitoring for a second downlink control channel order subsequent to preempting transmission of the random access message.

20. The method of claim 1, wherein transmitting or preempting transmission of the random access message comprises:
transmitting the random access message.

21. The method of claim 1, wherein a first subcarrier spacing of a bandwidth part of a serving cell on which the uplink preemption indication is transmitted differs from a second subcarrier spacing of the bandwidth part of the serving cell for the random access resource.

22. The method of claim 21, wherein transmitting or preempting transmission of the random access message comprises:
preempting transmission of the random access message during a first transmission time interval of the random access resource that overlaps with a second transmission time interval that the uplink preemption indication indicates is preempted, the first transmission time interval having a longer duration than the second transmission time interval.

23. The method of claim 21, wherein transmitting or preempting transmission of the random access message comprises:
transmitting the random access message during a first transmission time interval of the random access resource that does not overlap with a second transmission time interval that the uplink preemption indication indicates is preempted, the first transmission time interval having a longer duration than the second transmission time interval.

24. The method of claim 1, wherein identifying the preemption configuration comprises:
identifying that the preemption configuration indicates that uplink preemption applies to a random access procedure in a secondary cell.

25. The method of claim 1, wherein identifying the preemption configuration comprises:
identifying that the preemption configuration indicates that uplink preemption does not apply to a random access procedure in a primary cell.

26. A method for wireless communications by a base station, comprising:
establishing connectivity with a user equipment (UE) in a connected state;

transmitting, to the UE, an uplink preemption indication indicating that at least a portion of a random access resource is being preempted based at least in part on the connected state; and scheduling the random access resource based at least in part on the uplink preemption indication.

27. The method of claim 26, further comprising:

receiving, from the UE, a random access message in a next available random access resource subsequent to preempting transmission of the random access message via the random access resource.

28. The method of claim 26, further comprising:

transmitting a first control channel order that schedules transmission of a random access message; and transmitting a second control channel order subsequent to preempting transmission of the random access message.

29. An apparatus for wireless communications by a user equipment (UE), comprising:

a processor, memory coupled with the processor; and instructions stored in the memory and executable by the processor to cause the apparatus to:

identify a preemption configuration that indicates in which operating state of a plurality of operating states the UE is to monitor for an uplink preemption indication; and transmit or preempt transmission of a random access message via a random access resource based at least in part on the preemption configuration.

30. An apparatus for wireless communications by a base station, comprising:

a processor, memory coupled with the processor; and instructions stored in the memory and executable by the processor to cause the apparatus to:

establish connectivity with a user equipment (UE) in a connected state;

transmit, to the UE, an uplink preemption indication indicating that at least a portion of a random access resource is being preempted based at least in part on the connected state; and schedule the random access resource based at least in part on the uplink preemption indication.

* * * * *